United States Patent
Natarajan et al.

(10) Patent No.: US 11,093,551 B1
(45) Date of Patent: Aug. 17, 2021

(54) EXECUTION ENGINE FOR COMPOSITIONAL ENTITY RESOLUTION FOR ASSISTANT SYSTEMS

(71) Applicant: Facebook, Inc., Menlo Park, CA (US)

(72) Inventors: Vivek Natarajan, Palo Alto, CA (US); Baiyang Liu, Issaquah, WA (US); Shubham Gupta, Sunnyvale, CA (US); Krishna Mittal, Mountain View, CA (US); Scott Martin, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 27 days.

(21) Appl. No.: 16/129,638

(22) Filed: Sep. 12, 2018

Related U.S. Application Data

(60) Provisional application No. 62/660,876, filed on Apr. 20, 2018.

(51) Int. Cl.
  *G10L 17/22* (2013.01)
  *G06F 16/9032* (2019.01)
  (Continued)

(52) U.S. Cl.
  CPC .. *G06F 16/90332* (2019.01); *G06F 16/90335* (2019.01); *G06F 40/205* (2020.01);
  (Continued)

(58) Field of Classification Search
  None
  See application file for complete search history.

(56) References Cited

U.S. PATENT DOCUMENTS

| 7,124,123 | B1 | 10/2006 | Roskind |
| 7,158,678 | B2 | 1/2007 | Nagel |

(Continued)

FOREIGN PATENT DOCUMENTS

| AU | 2017203668 | 1/2018 |
| EP | 2530870 | 12/2012 |

(Continued)

OTHER PUBLICATIONS

U.S. Appl. No. 14/593,723, filed Jan. 9, 2015, Colin Patrick Treseler.

(Continued)

*Primary Examiner* — Seong-Ah A Shin
(74) *Attorney, Agent, or Firm* — Baker Botts L.L.P.

(57) ABSTRACT

In one embodiment, a method includes, by one or more computing systems, receiving a user input comprising a plurality of n-grams from a user of a client system, generating a tree-structured representation for the user input based on a parsing by a compositional model, resolving the tree-structured representation by applying a depth-first search algorithm, wherein the tree-structured representation comprises one or more non-resolvable non-terminal nodes associated with one or more slots, and wherein each non-terminal parent node of a non-resolvable non-terminal node is partially resolved based on partial slot information associated with the non-resolvable non-terminal node, and wherein each non-resolvable non-terminal node is resolved based on the respective partially resolved non-terminal parent node of the non-resolvable non-terminal node, generating a response to the user input based on the resolved tree-structured representation, sending instructions for presenting the response to the client system of the user.

18 Claims, 14 Drawing Sheets

(51) Int. Cl.
   *G10L 15/16* (2006.01)
   *G06N 3/08* (2006.01)
   *G10L 15/187* (2013.01)
   *G06F 16/903* (2019.01)
   *G06F 40/205* (2020.01)

(52) U.S. Cl.
   CPC ............... *G06N 3/08* (2013.01); *G10L 15/16* (2013.01); *G10L 15/187* (2013.01)

(56) References Cited

U.S. PATENT DOCUMENTS

| | | | |
|---|---|---|---|
| 7,397,912 | B2 | 7/2008 | Aasman |
| 8,027,451 | B2 | 9/2011 | Arendsen |
| 8,560,564 | B1 | 10/2013 | Hoelzle |
| 8,677,377 | B2 | 3/2014 | Cheyer |
| 8,935,192 | B1 | 1/2015 | Ventilla |
| 8,983,383 | B1 | 3/2015 | Haskin |
| 9,154,739 | B1 | 10/2015 | Nicolaou |
| 9,299,059 | B1 | 3/2016 | Marra |
| 9,304,736 | B1 | 4/2016 | Whiteley |
| 9,338,242 | B1 | 5/2016 | Suchland |
| 9,338,493 | B2 | 5/2016 | Van Os |
| 9,390,724 | B2 | 7/2016 | List |
| 9,418,658 | B1 | 8/2016 | David |
| 9,472,206 | B2 | 10/2016 | Ady |
| 9,479,931 | B2 | 10/2016 | Ortiz |
| 9,576,574 | B2 | 2/2017 | van Os |
| 9,659,577 | B1 | 5/2017 | Langhammer |
| 9,747,895 | B1 | 8/2017 | Jansche |
| 9,792,281 | B2 | 10/2017 | Sarikaya |
| 9,858,925 | B2 | 1/2018 | Gruber |
| 9,865,260 | B1 | 1/2018 | Vuskovic |
| 9,875,233 | B1 | 1/2018 | Tomkins |
| 9,875,741 | B2 | 1/2018 | Gelfenbeyn |
| 9,886,953 | B2 | 2/2018 | Lemay |
| 9,990,591 | B2 | 6/2018 | Gelfenbeyn |
| 10,042,032 | B2 | 8/2018 | Scott |
| 10,134,395 | B2 | 11/2018 | Typrin |
| 10,199,051 | B2 | 2/2019 | Binder |
| 10,241,752 | B2 | 3/2019 | Lemay |
| 10,276,170 | B2 | 4/2019 | Gruber |
| 2005/0004907 | A1* | 1/2005 | Bruno ................ G06F 16/2462 |
| 2008/0240379 | A1 | 10/2008 | Maislos |
| 2012/0246191 | A1 | 9/2012 | Xiong |
| 2012/0265528 | A1 | 10/2012 | Gruber |
| 2013/0268839 | A1 | 10/2013 | Lefebvre |
| 2013/0275138 | A1 | 10/2013 | Gruber |
| 2013/0275164 | A1* | 10/2013 | Gruber ................... G10L 17/22 705/5 |
| 2014/0164506 | A1 | 6/2014 | Tesch |
| 2015/0179168 | A1 | 6/2015 | Hakkani-Tur |
| 2015/0248476 | A1* | 9/2015 | Weissinger ............ H04L 65/60 707/737 |
| 2015/0347375 | A1* | 12/2015 | Tremblay ............. G06F 40/211 704/9 |
| 2016/0225370 | A1 | 8/2016 | Kannan |
| 2016/0253630 | A1* | 9/2016 | Oliveri .................... H04L 51/18 705/7.19 |
| 2016/0255082 | A1 | 9/2016 | Rathod |
| 2016/0328096 | A1 | 11/2016 | Tran |
| 2016/0378849 | A1 | 12/2016 | Myslinski |
| 2016/0378861 | A1 | 12/2016 | Eledath |
| 2017/0091168 | A1 | 3/2017 | Bellegarda |
| 2017/0132019 | A1 | 5/2017 | Karashchuk |
| 2017/0255536 | A1* | 9/2017 | Weissinger ............ G06Q 50/01 |
| 2017/0351786 | A1* | 12/2017 | Quattoni ................ G06F 30/20 |
| 2017/0353469 | A1 | 12/2017 | Selekman |
| 2017/0359707 | A1 | 12/2017 | Diaconu |
| 2018/0013699 | A1* | 1/2018 | Sapoznik ............ G06F 40/205 |
| 2018/0018562 | A1 | 1/2018 | Jung |
| 2018/0018987 | A1 | 1/2018 | Zass |
| 2018/0096071 | A1 | 4/2018 | Green |
| 2018/0096072 | A1 | 4/2018 | He |
| 2018/0107917 | A1 | 4/2018 | Hewavitharana |
| 2018/0189629 | A1 | 7/2018 | Yatziv |
| 2019/0080698 | A1 | 3/2019 | Miller |

FOREIGN PATENT DOCUMENTS

| | | |
|---|---|---|
| EP | 3122001 | 1/2017 |
| WO | WO 2012/116241 | 8/2012 |
| WO | WO 2016/195739 | 12/2016 |
| WO | WO 2017/053208 | 3/2017 |
| WO | WO 2017/116488 | 7/2017 |

OTHER PUBLICATIONS

U.S. Appl. No. 15/808,638, filed Nov. 9, 2017, Ryan Brownhill.
U.S. Appl. No. 15/953,957, filed Apr. 16, 2018, Kemal El Moujahid.
U.S. Appl. No. 15/966,455, filed Apr. 30, 2018, Scott Martin.
U.S. Appl. No. 15/967,193, filed Apr. 30, 2018, Davide Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 62/660,876, filed Apr. 20, 2018, Anuj Kumar.

(56) References Cited

OTHER PUBLICATIONS

U.S. Appl. No. 62/660,879, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
Mari Ostendorf, et al.: Human Language Technology: Opportunities and Challenges, IEEE International Conference on Acoustics, Speech, and Signal Processing, Mar. 23, 2005.
Adam Poliak, et al.: Efficient, Compositional, Order-Sensitive n-gram Embeddings, Proceedings of the 15th Conference of the European Chapter of the Association for Computational Linguistics: vol. 2, Short Papers, pp. 503-508, Valencia, Spain, Apr. 3-7, 2017.
Chris Dyer, et al.: Recurrent Neural Network Grammars, Proceedings of NAACL-HLT 2016, pp. 199-209, San Diego, California, Jun. 12-17, 2016.
Overview of Language Technology, https://www.dfki.de/lt/lt-general.php, Feb. 15, 2018
Jim Glass: A Brief Introduction to Automatic Speech Recognition, http://www.cs.columbia.edu/~mcollins/6864/slides/asr.pdf, Feb. 15, 2018.
Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/, Feb. 15, 2018.
What is Conversational AI? https://blog.salemove.com/what-is-conversational-ai/, Feb. 15, 2018.
Question Answering, https://en.wikipedia.org/wiki/Question_answering, Feb. 15, 2018.
Dialog Manager, https://en.wikipedia.org/wiki/Dialog_manager, Feb. 15, 2018.
Dialog Management, https://tutorials.botsfloor.com/dialog-management-799c20a39aad, Feb. 15, 2018.
Steeve Huang, Word2Vec and FastText Word Embedding with Gensim, https://towardsdatascience.com/word-emb edding-with-word2vec-and-fasttext-a209c1d3e12c, Mar. 13, 2018.
Ashwini Challa, et al.: Generate, Filter, and Rank: Grammaticality Classification for Production-Ready NLG Systems, arXiv:1904.03279, Apr. 9, 2019.
Honglei Liu, et al.: Explore-Exploit: A Framework for Interactive and Online Learning, arXiv:1812.00116, Dec. 1, 2018.
Turniški, Filip, et al. "Analysis of 3G and 4G download throughput in pedestrian zones." 2016 International Symposium ELMAR. IEEE, Sep. 12, 2016.
Dubin, Ran, et al. "Adaptation Logic for HTTP Dynamic Adaptive Streaming using Geo-Predictive Crowdsourcing." arXiv preprint arXiv:1602.02030 (Feb. 5, 2016).
Chat Extensions, https://developers.facebook.com/docs/messenger-platform/guides/chat-extensions, Apr. 18, 2017.
Google Allo Makes Conversations Eeasier, Productive, and more Expressive, https://www.trickyways.com/2016/05/google-allo-makes-conversations-eeasier-productive-expression/, May 19, 2016.
European search report received from the European Patent Office for European Patent Application No. 18201683.2-1222, dated Feb. 4, 2019.
European search report received from the European Patent Office for European Patent Application No. 18201685.7-1222, dated Feb. 4, 2019.
European search report received from the European Patent Office for European Patent Application No. 18201805.1-1222, dated Feb. 4, 2019.
European search report received from the European Patent Office for European Patent Application No. 18201808.5-1222, dated Feb. 4, 2019.
European search report received from the European Patent Office for European Patent Application No. 18201820.0-1222, dated Feb. 5, 2019.
European search report received from the European Patent Office for European Patent Application No. 18201826.7-1222, dated Feb. 4, 2019.
European search report received from the European Patent Office for European Patent Application No. 18203627.7-1222, dated Feb. 5, 2019.
European search report received from the European Patent Office for European Patent Application No. 18203675.7-1222, dated Feb. 5, 2019.
European search report received from the European Patent Office for European Patent Application No. 19155094.6-1218, dated Mar. 19, 2019.

* cited by examiner

EXECUTION ENGINE FOR COMPOSITIONAL ENTITY RESOLUTION FOR ASSISTANT SYSTEMS

PRIORITY

This application claims the benefit, under 35 U.S.C. § 119(e), of U.S. Provisional Patent Application No. 62/660,876, filed 20 Apr. 2018, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may understand nested user inputs using a compositional model within a natural-language understanding module of the assistant system. As an example and not by way of limitation, a nested user input like "how do I get to John's mom's house?" would require the assistant system to first resolve an inner query to determine who John's mom is, and then determine where her house is, and finally resolve an outer query of directions to her house. The resolving of the identity of John's mom and the location of her house may be subject to the privacy settings of the respective users (e.g., privacy settings associated with both John and his mom in this example), where the assistant system may not resolve certain portions of the user input if the information is not accessible/visible by the requesting user. In particular embodiments, the assistant system may identify, for the nested user input, an overall intent, multiple slots, and one or more hidden intents associated with the multiple slots within a single domain or across multiple domains. The identified overall intent, hidden intents, and slots may be further provided to a dialog engine of the assistant system, which may interact with different agents to execute different tasks based on the understanding of the nested user input. In particular embodiments, the compositional model may be based on a deep learning architecture comprising multiple long-short term memory (LSTM) networks. The compositional model may parse the nested user input into a tree-structured representation and use a recurrent neural network grammar (RNNG) model, which is a type of recurrent and recursive LSTM algorithm, to process the tree-structured representation to generate a vector-based feature representation. The tree-structured representation may carry more constraints, which may help obtain a more structural understanding of the nested user input. In particular embodiments, the compositional model may be trained using training samples associated with different domains. The compositional model may be generatively or discriminatively trained, which is able to understand various types of nested user input. Additionally, the compositional model may be domain specific and a domain classifier may be used to select the proper domain-based compositional model when receiving a nested user input. The compositional model may result in a technical advantage of more accurate understanding of user input, in addition to enabling support for new types of user requests. Although this disclosure describes understanding particular user input based on particular models in a particular manner, this disclosure contemplates understanding any suitable user input based on any suitable models in any suitable manner.

In particular embodiments, the assistant system may receive, from a client system associated with a first user, a user input by the first user. The assistant system may then parse, by a compositional model, the user input to identify one or more intents and one or more slots. The compositional model may be based on a recurrent neural network grammar (RNNG) model that comprises one or more long-short term memory (LSTM) networks. The one or more long-short term memory (LSTM) networks may calculate a probability that a particular portion of the user input corresponds to a particular intent or slot. In particular embodiments, the assistant system may generate, by the compositional model, a tree-structured representation for the user input based on the parsing. The tree-structured representation may comprise one or more non-terminal nodes associated with the one or more intents, one or more non-terminal nodes associated with the one or more slots, and one or more terminal nodes associated with one or more n-grams of the user input. The assistant system may further generate a feature vector for the tree-structured representation of the user input based on a deep learning algorithm.

In particular embodiment, the assistant system may resolve nested user inputs using a dialog engine of the assistant system. The assistant system may occasionally receive nested user inputs to process. To do so, the assistant system first uses a compositional model within the natural-language understanding module to parse the user input to a query command by identifying an overall intent for the request, multiple slots (i.e., entities or subjects), and one or more hidden intents within the multiple slots within a single domain or across multiple domains. In particular embodiments, the assistant system may receive the user input in the form of a text input (e.g., "Gas station near Kim's mom's house") and convert it into a block structure (e.g., [Gas station near [[[Kim's] mom's] house]]). The block structure may include terminal nodes to represent the n-grams and non-terminal nodes that represent the slots and intents. The conversion of the user input into a block structure helps prioritize which slot and/or intent to resolve first. As an example and not by way of limitation, for a user input "Gas station near Kim's mom's house," the assistant system may identify the following query constraints for the query command: an overall intent as [IN:find_location ("Gas station")], a hidden intent as [IN:find_location ("Kim's mom's house")], a contact slot [SL:contact ("Kim's")], a relation slot [SL:relation ("mom's")], a type slot [SL:type ("house")], and an overall location slot [SL:location ("Kim's mom's house")]. By identifying the overall intents, the assistant system may identify what information the user is requesting with the nested user input. The hidden intents (i.e., inner queries) may direct the assistant system 140 to determine further information prior to resolving the overall intent (i.e., outer query). With the example block structure described above, the assistant system may resolve the hidden intent first by finding the location associated with "Kim's mom's house." In order to find the location associated with the overall location slot [SL:location ("Kim's mom's house")], the assistant system may determine who is Kim and proceeds to determine who Kim's mom is, and finally the home address of Kim's mom. The assistant system may use first-party agents and/or third-party agents to resolve the entities associated with the slots. Additionally, the assistant system may check the appropriate privacy settings to ensure that the information is available to the user (e.g., Kim and the querying user are friends, Kim's mom and the user are friends, and Kim's mom shares her location with her friends on the online social network). Continuing the example, the assistant system may use a social graph to identify the contact, Kim, use the social graph to find who resolves the mom relation with Kim, and identify the home address location associated with Kim's mom. After resolving the hidden intent [IN:find_location ("Kim's mom's house")], the assistant system may proceed to the overall intent [IN:find_location ("Gas station")] by accessing a third-party agent and determining the closest gas station to the geographic location associated with Kim's mom's house. After the query command is fully resolved, the output may be provided to the conversational understanding composer, which can generate a response to present to the querying user. Although this disclosure describes resolving nested user inputs in a particular manner, this disclosure contemplates resolving nested user inputs in any suitable manner.

Certain technical challenges exist for achieving the goal of accurately understanding and resolving nested user input. One technical challenge includes identifying subjects associated with the n-grams of the user input and the relationship among the subjects. The solution presented by the embodiments disclosed herein to address the above challenge is a compositional model that parses the user input into a tree-structured representation characterizing the subjects and their relationship. Another technical challenge includes providing the result obtained from the compositional model to other modules of the assistant system in an executable format. The solution presented by the embodiments disclosed herein to address this challenge is by generating the output in a nested tree-structure of intents and slots, which can easily be understood by the downstream components by mapping them to executable API calls. The nested intent and slot tree structures may be compatible with the widely used intent and slot execution systems. Another technical challenge includes decision making in which order to resolve the intent and slots. The solution presented by the embodiments disclosed herein to address this challenge is by using the nested tree-structure to identify which intents and slots to resolve first. The slots may be prioritized and then the intents may be resolved with the information from the resolved slots. Another technical challenge includes trying to resolve a non-resolvable node. A slot may be non-resolvable when the assistant system may not identify any entity associated with a slot. The solution presented by the embodiments disclosed herein to address this challenge is to partially resolve any non-resolvable nodes and pass up partial information to parent nodes. Subsequent to partially resolving parent nodes, the assistant system may identify a context associated with the non-resolvable nodes and return to resolve the non-resolvable node.

Certain embodiments disclosed herein may provide one or more technical advantages. A technical advantage of the embodiments may include more accurate understanding and resolving of user input. Another technical advantage of the embodiments may include fast response to a nested user input as it is efficient to process vector-based representations with different modules of the assistant system. Certain embodiments disclosed herein may provide none, some, or all of the above technical advantages. One or more other technical advantages may be readily apparent to one skilled in the art in view of the figures, descriptions, and claims of the present disclosure.

In particular embodiments, the assistant system may receive a user input comprising a plurality of n-grams from a first user of a client system. The first user may be a user of an online-social network. In particular embodiments, the assistant system may generate, by a compositional model, a tree-structured representation for the first user input based on a parsing by a compositional model. The tree-structured representation may comprise one or more non-terminal nodes associated with the one or more intents, one or more non-terminal nodes associated with the one or more slots, and one or more terminal nodes associated with one or more n-grams of the first user input. In particular embodiments, the assistant system may resolve the tree-structured representation by applying a depth-first search algorithm. The tree-structured representation may comprise one or more non-resolvable non-terminal nodes associated with the one or more slots. The partial slot information associated with each non-resolvable non-terminal node may be passed to a respective non-terminal parent node. Each non-terminal parent node of a non-resolvable non-terminal node may be partially resolved based on the partial slot information. Each non-resolvable non-terminal node may be resolved based on the respective partially resolved non-terminal parent node of the non-resolvable non-terminal node. In particular embodiments, the assistant system may generate a response to the first user input based on the resolved tree-structured representation. In particular embodiments, the assistant system may send, to the client system of the first user, instructions for presenting the response.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
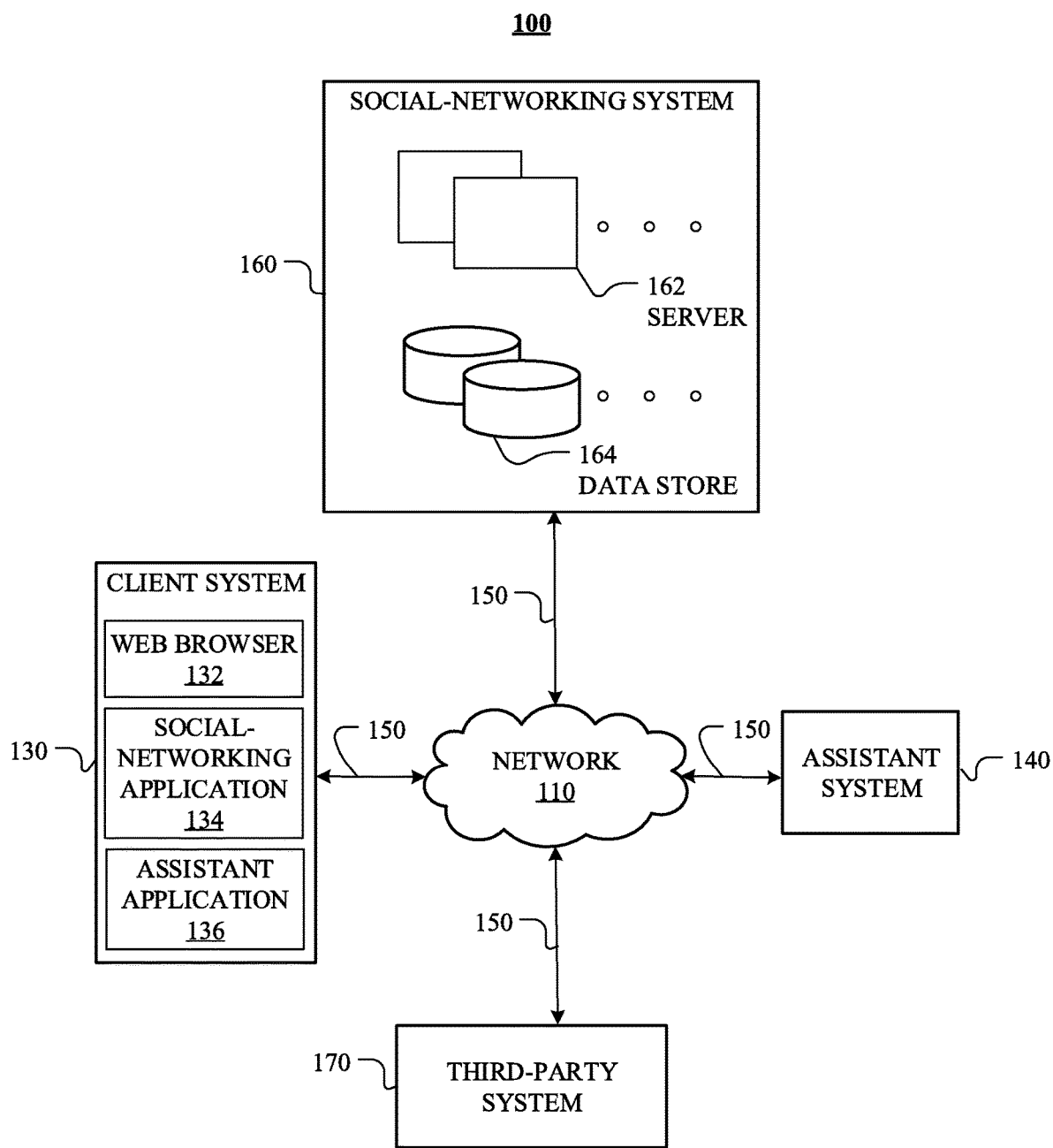
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. Design Patent Application Ser. No. 29/631,910, filed 3 Jan. 2018, U.S. Design Patent Application Ser. No. 29/631,747, filed 2 Jan. 2018, U.S. Design Patent Application Ser. No. 29/631,913, filed 3 Jan. 2018, and U.S. Design Patent Application Ser. No. 29/631,914, filed 3 Jan. 2018, which are incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
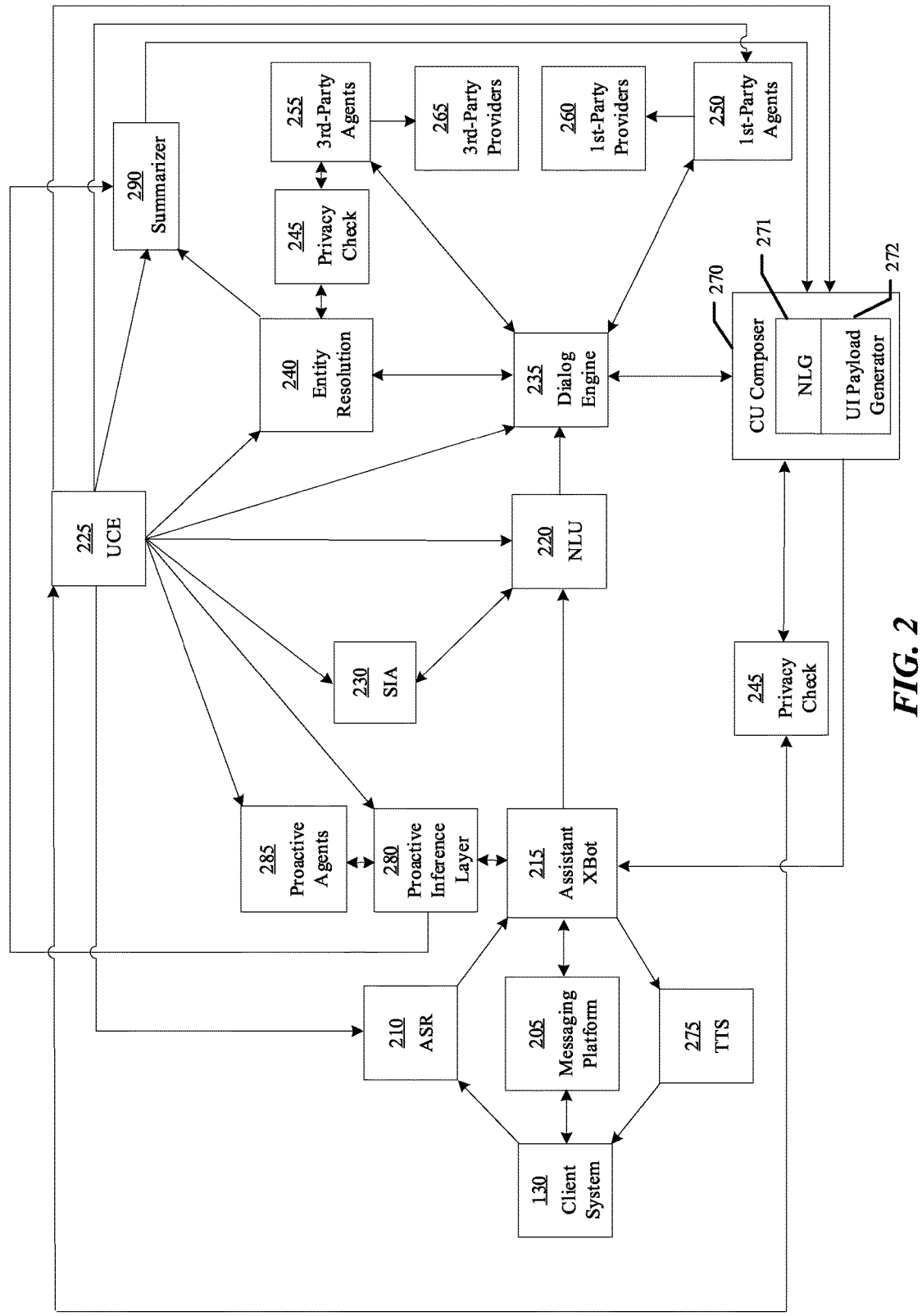
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings.

In particular embodiments, the assistant system 140 may receive a user input from the assistant application 136 in the client system 130 associated with the user. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an audio speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. The semantic information aggregator 230 may provide ontology data associated with a plurality of predefined domains, intents, and slots to the NLU module 220. In particular embodiments, a domain may denote a social context of interaction, e.g., education. An intent may indicate a purpose of a user interacting with the assistant system 140. A slot may represent a basic semantic entity. For example, a slot for "pizza" may be dish. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the movies". The NLU module 220 may identify the particular movie theatre that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., online social network, online encyclopedia, movie review sources, media databases, and entertainment content sources), and then deduped, resolved, and fused to generate the single unique record for the knowledge graph. The entity may be associated with a space attribute value which indicates the genre of the movie "The Martian" (2015). The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score.

In particular embodiments, the dialog engine 235 may communicate with different agents based on the identified intent and domain, and the resolved entities. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., music streams agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275.

Figure 3:
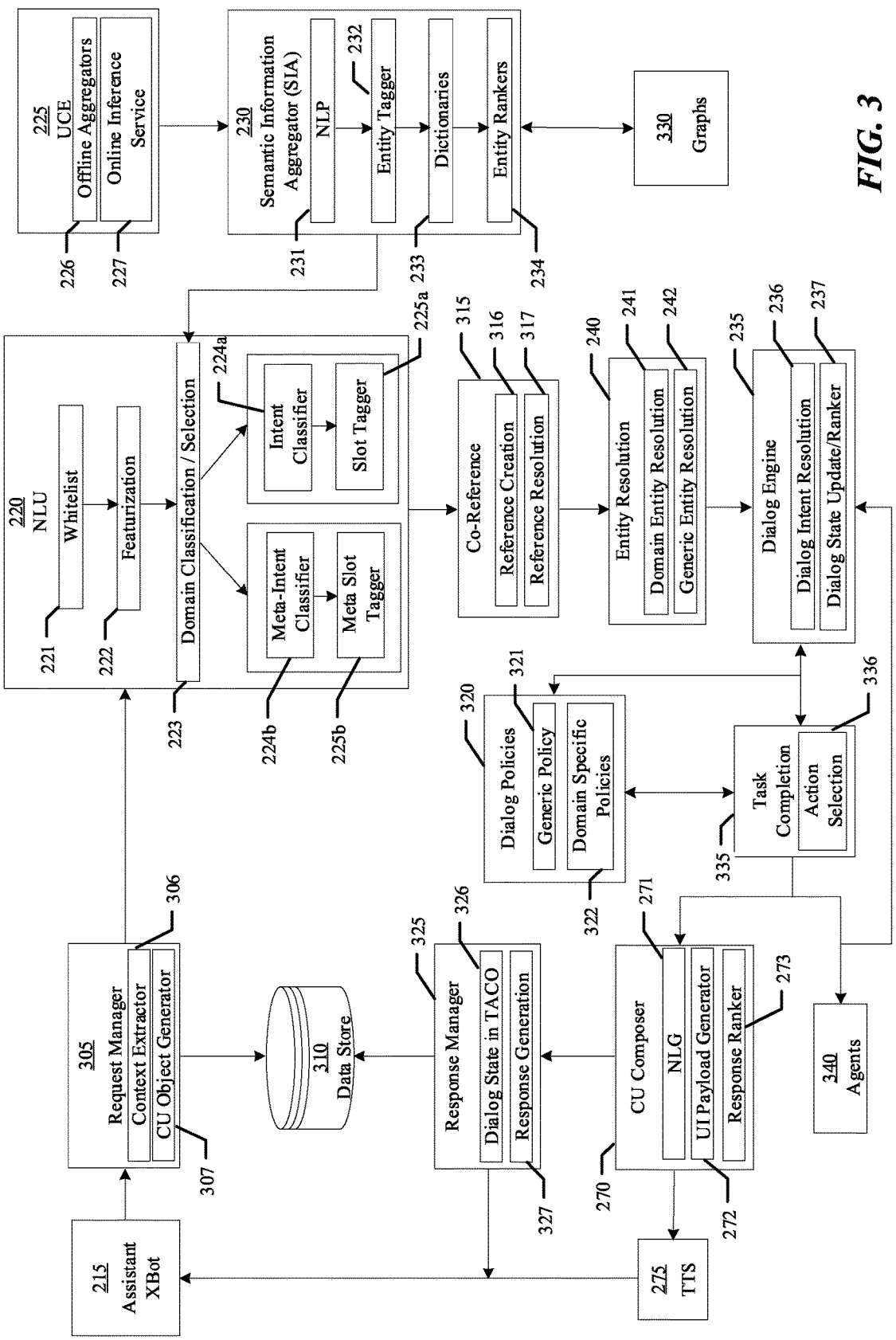
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The CU object generator 307 may generate particular content objects relevant to the user request. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. At step 222, the NLU module 220 may perform a featurization based on the whitelist. At step 223, the NLU module 220 may perform domain classification/selection based on the features resulted from the featurization. The domain classification/selection results may be further processed based on two related procedures. At step 224a, the NLU module 220 may process the domain classification/selection result using an intent classifier. The intent classifier may determine the user's intent associated with the user request. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. At step 225b, the NLU module 220 may use a meta slot tagger to annotate one or more slots for the classification result from the meta-intent classifier. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). At step 232, the processing result may be annotated with entities by an entity tagger. Based on the annotations, the semantic information aggregator 230 may generate dictionaries for the retrieved information at step 233. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest gas station and direct me there". The co-reference module 315 may interpret "there" as "the nearest gas station". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a brand of electric car, the generic entity resolution 242 may resolve the brand of electric car as vehicle and the domain entity resolution 241 may resolve the brand of electric car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session. In particular embodiments, the dialog state update/ranker 237 may update/rank the state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. The task completion module 335 may comprise an action selection component 336. In particular embodiments, the dialog engine 235 may additionally check against dialog policies 320 regarding the dialog state. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Compositional Representation and Modeling for Natural-Language Understanding

In particular embodiments, an assistant system 140 may understand nested user inputs using a compositional model within a natural-language understanding module 220 of the assistant system 140. As an example and not by way of limitation, a nested user input like "how do I get to John's mom's house?" would require the assistant system 140 to first resolve an inner query to determine who John's mom is, and then determine where her house is, and finally resolve an outer query of directions to her house. The resolving of the identity of John's mom and the location of her house may be subject to the privacy settings of the respective users (e.g., privacy settings associated with both John and his mom in this example), where the assistant system 140 may not resolve certain portions of the user input if the information is not accessible/visible by the requesting user. In particular embodiments, the assistant system 140 may identify, for the nested user input, an overall intent, multiple slots, and one or more hidden intents associated with the multiple slots within a single domain or across multiple domains. The identified overall intent, hidden intents, and slots may be further provided to a dialog engine 235 of the assistant system 140, which may interact with different agents to execute different tasks based on the understanding of the nested user input. In particular embodiments, the compositional model may be based on a deep learning architecture comprising multiple long-short term memory (LSTM) networks. The compositional model may parse the nested user input into a tree-structured representation and use a recurrent neural network grammar (RNNG) model, which is a type of recurrent and recursive LSTM algorithm, to process the tree-structured representation to generate a vector-based feature representation. The tree-structured representation may carry more constraints, which may help obtain a more structural understanding of the nested user input. In particular embodiments, the compositional model may be trained using training samples associated with different domains. The compositional model may be generative, which is able to understand various types of nested user input. Alternatively, the compositional model may be domain specific and a domain classifier may be used to select the proper domain-based compositional model when receiving a nested user input. The compositional model may result in a technical advantage of more accurate understanding of user input. Although this disclosure describes understanding particular user input based on particular models in a particular manner, this disclosure contemplates understanding any suitable user input based on any suitable models in any suitable manner.

In particular embodiments, the assistant system 140 may receive, from a client system 130 associated with a first user, a user input by the first user. The assistant system 140 may then parse, by a compositional model, the user input to identify one or more intents and one or more slots. The compositional model may be based on a recurrent neural network grammar (RNNG) model that comprises one or more long-short term memory (LSTM) networks. The one or more long-short term memory (LSTM) networks may calculate a probability that a particular portion of the user input corresponds to a particular intent or slot. In particular embodiments, the assistant system 140 may generate, by the compositional model, a tree-structured representation for the user input based on the parsing. The tree-structured representation may comprise one or more non-terminal nodes associated with the one or more intents, one or more non-terminal nodes associated with the one or more slots, and one or more terminal nodes associated with one or more n-grams of the user input. The assistant system 140 may further generate a feature vector for the tree-structured representation of the user input based on a deep learning algorithm.

In particular embodiments, the user input may be associated with one or more domains. As an example and not by way of limitation, the user input "best majors in Stanford University" may be associated with one domain which is education. As another example and not by way of limitation, the user input "Justin Timberlake's performance at Super Bowl 2018" may be associated with two domains which are entertainment and sports. In particular embodiments, the one or more intents may comprise an overall intent. The one or more intents may also comprise one or more hidden intents. In particular embodiments, the one or more hidden intents may be determined based on the one or more slots. As an example and not by way of limitation, the user input "traffic to John's birthday party" may be associated with an overall intent as finding traffic information and a hidden intent as finding location information. In addition, the intent of finding location information may be determined based on the slots [SL:location ("John's birthday party")]. In particular embodiments, resolving particular slots may be subject to the privacy settings of the respective users. As an example and not by way of limitation, continuing with the prior example, the location information needed to resolve [SL:location ("John's birthday party")] may be subject to the privacy settings associated with the user "John", such that this user input can only be resolved if the location information associated with the event "John's birthday part" is accessible/visible to the requesting user. Although this disclosure describes particular user input in a particular manner, this disclosure contemplates any suitable user input in any suitable manner.

Figure 4:
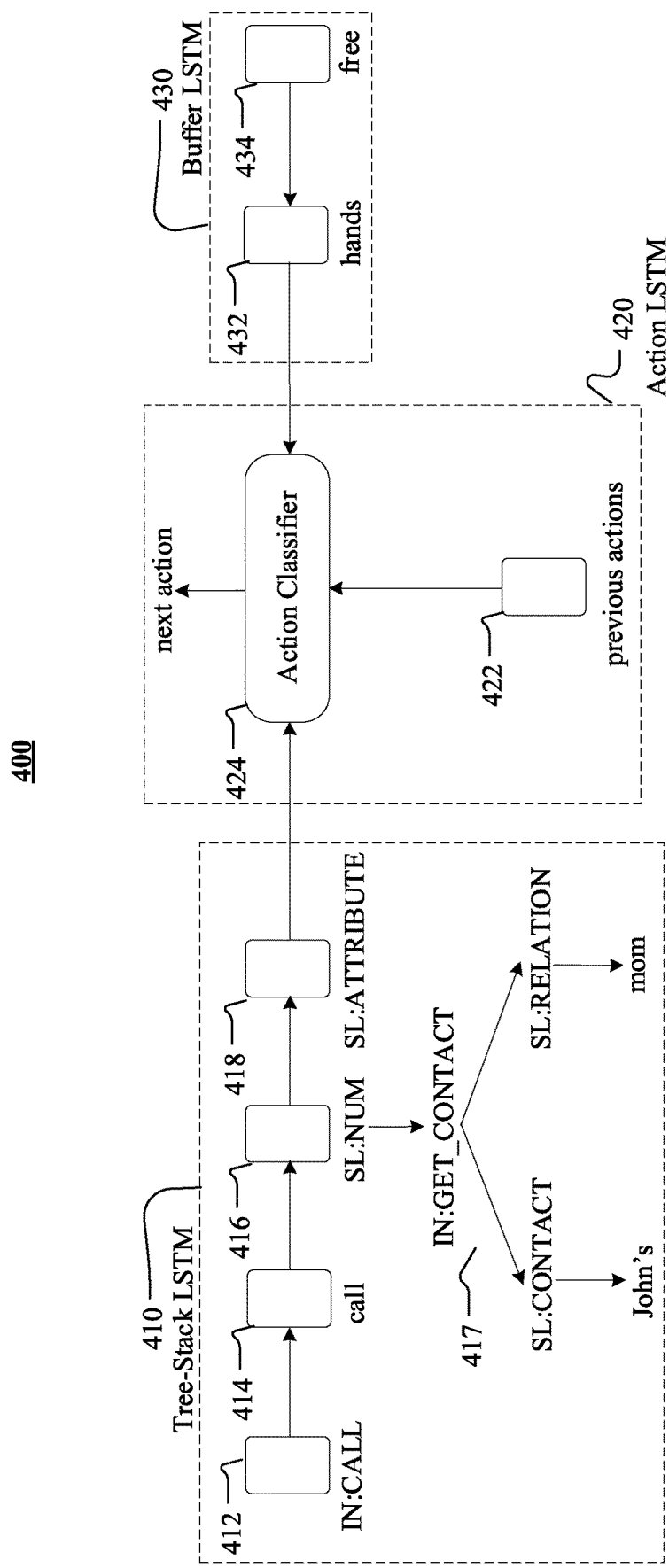
FIG. 4 illustrates an example architecture of a compositional model.

FIG. 4 illustrates an example architecture of a recurrent neural network grammar (RNNG) model exemplified by an example user input "call John's mom hands free". In particular embodiments, the RNNG model may comprise one or more long-short term memory (LSTM) networks. The one or more LSTM networks may comprise one or more of: a tree-stack LSTM network 410; an action LSTM network 420; or a buffer LSTM network 430. In particular embodiments, the tree-stack LSTM network 410 may comprise the representations of the intents, slots, and n-grams that have been processed by the action LSTM network 420. As displayed in FIG. 4, the tree-stack LSTM network 410 may comprise a representation 412 corresponding to the overall intent [IN:call(number)], a representation 414 corresponding to the n-gram "call", a representation 416 corresponding to the subtree 417 under the node [SL:num], and a representation 418 corresponding to the attribute slot [SL:attribute]. In particular embodiments, the buffer LSTM network 430 may comprise the representations of the n-grams of the user input that await to be processed. As displayed in FIG. 4, there may be another two n-grams, i.e., "hands" and "free" awaiting to be processed. As a result, the buffer LSTM network 430 may comprise a representation 432 corresponding to the n-gram "hands" and a representation 434 corresponding to the n-gram "free". In particular embodiments, the action LSTM network 420 may execute one or more actions comprising one or more of: determining an intent; determining a slot; adding an n-gram as a terminal node in the tree-structured representation; completing a subtree in the tree-structured representation; or completing the tree-structured representation. In particular embodiments, the action of adding an n-gram as a terminal node in the tree-structured representation may be defined as a "shift" action which also moves an n-gram from the buffer LSTM network 430 to the tree-stack LSTM network 410. Using the compositional model to parse the user input into a tree-structured representation may be an effective solution for addressing the technical challenge of identifying subjects associated with the n-grams of the user input and the relationship among the subjects as the subjects together with their relationship are characterized in an organized way by the tree-structured representation. In particular embodiments, the action of completing a subtree in the tree-structured representation or the tree-structured representation may be defined as a "reduce" action. After each "reduce" action, the assistant system 140 may generate a feature vector for the completed subtree or tree-structured representation based on a deep learning algorithm. In particular embodiments, the deep learning algorithm may be based on a bi-directional long-short term memory (LSTM) algorithm. The deep learning algorithm may summarize a sequence of vectors to one vector. As displayed in FIG. 4, the action LSTM network 420 may comprise a representation 422 corresponding to previous actions and an action classifier 424 which may determine the next action. For example, the representation 432 for "hands" and the representation 434 for "free" may be sent to the action classifier 424 for determining the next action. The actions for them may comprise predicting them as attribute slots and adding them as child nodes for [SL:attribute]. In particular embodiments, the tree-stack LSTM network 410 may also comprise an input to the action classifier 424. For example, after the representation 432 for "hands" and the representation 434 for "free" are added under [SL:attribute], the action classifier 424 may be triggered to determine a next action, which may comprise a "reduce" action to complete the subtree under [SL:attribute] by generating a vector for this subtree. Although this disclosure describes particular architectures for a particular RNNG model in a particular manner, this disclosure contemplates any suitable architectures for any suitable RNNG model in any suitable manner.

Figure 5:
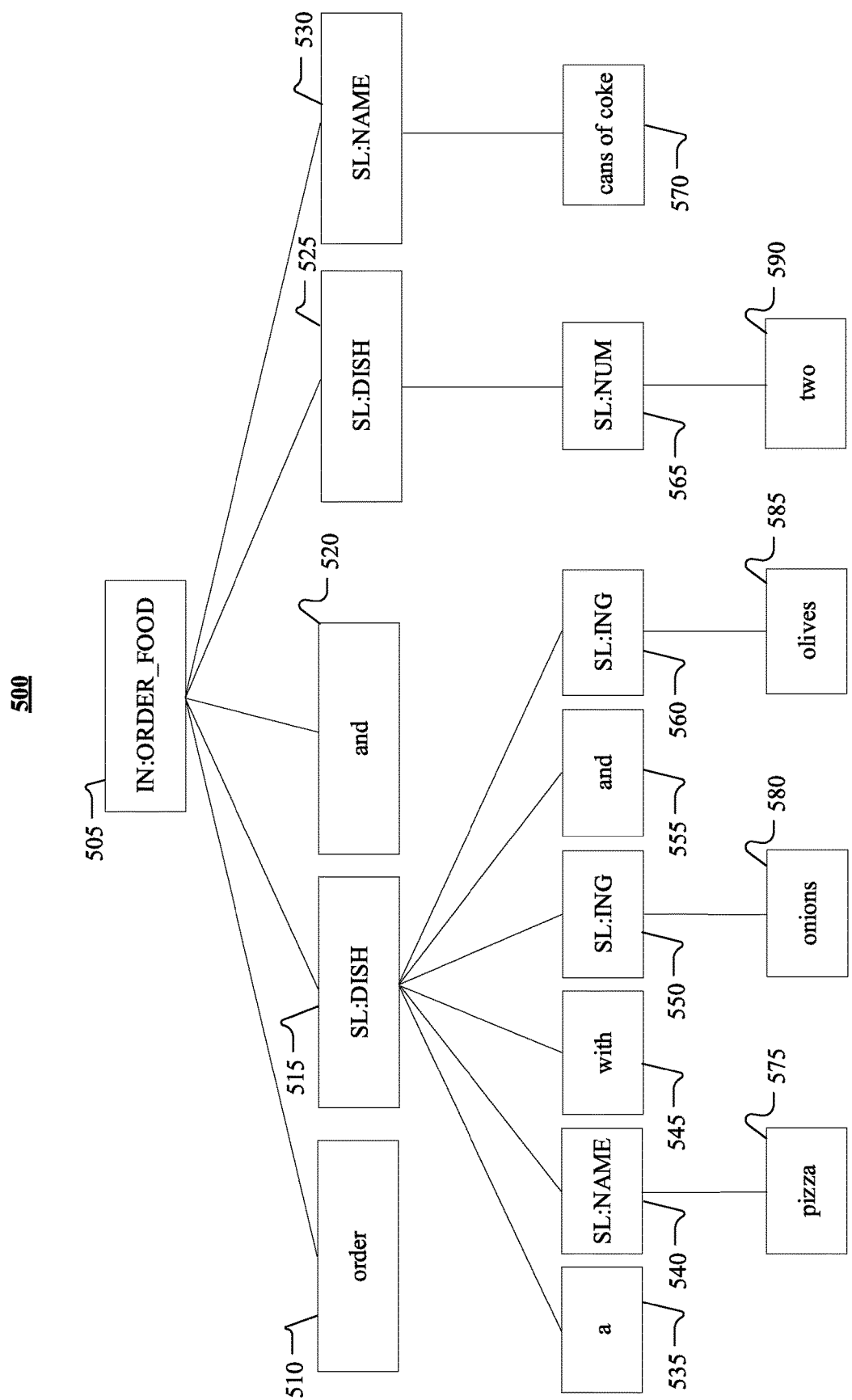
FIG. 5 illustrates an example parsing result of a user input.
Figure 6:
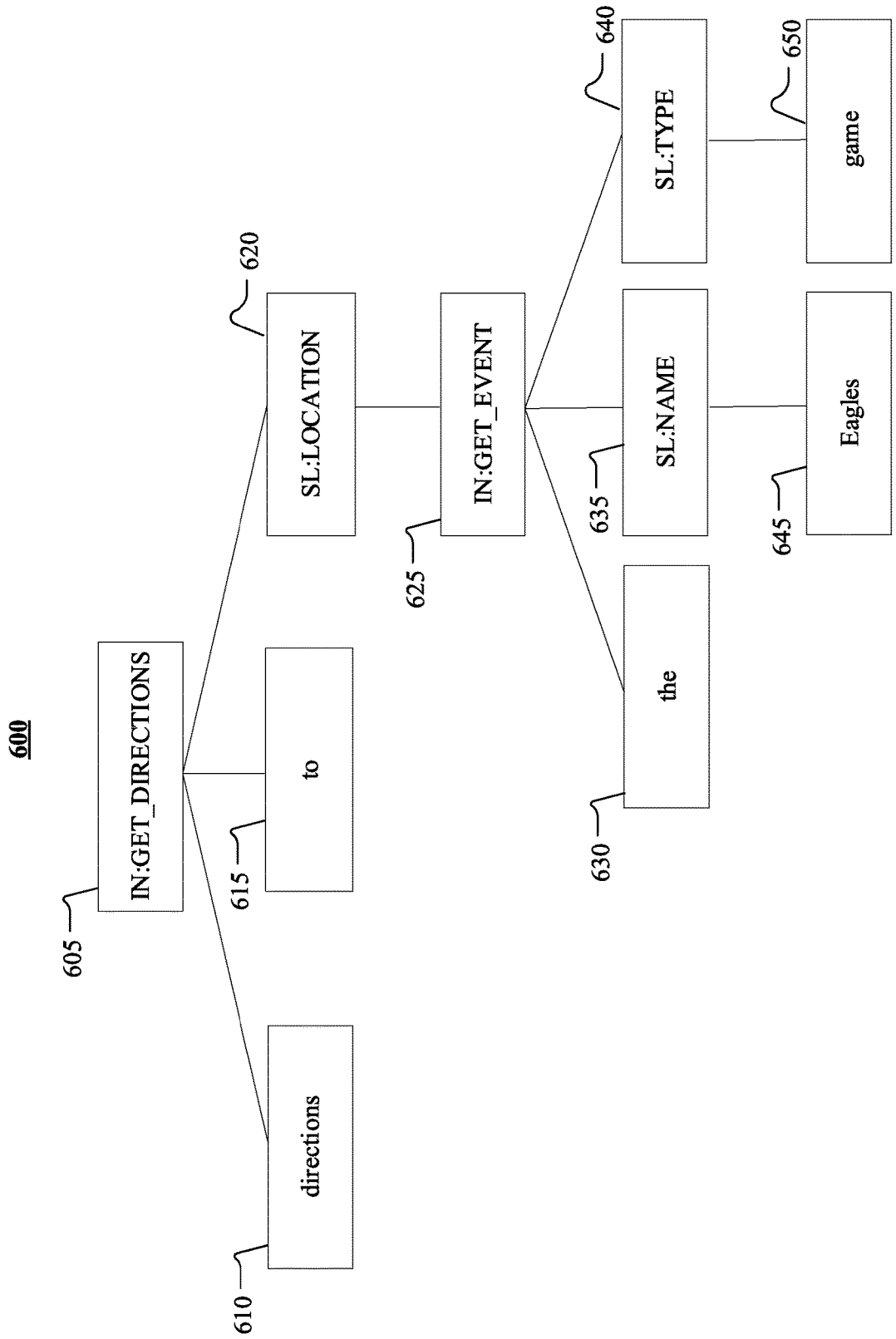
FIG. 6 illustrates another example parsing result of another user input.

FIGS. 5-6 illustrate example tree-structured representations for example user inputs. FIG. 5 illustrates an example tree-structured representation for an example user input "order a pizza with onions and olives and two cans of coke". In particular embodiments, the tree-structured representation may comprise a root node. The root node may be associated with the overall intent. As an example and not by way of limitation, the root node in FIG. 5 may comprise an overall intent of [IN:order_food(dish)] 505. In particular embodiments, each of the one or more non-terminal nodes associated with the one or more intents may have one or more child nodes. The one or more child nodes may comprise one or more of: a node associated with one of the one or more slots; or a node associated with one of the one or more n-grams. As an example and not by way of limitation, the child nodes of the root node in FIG. 5 may comprise an n-gram "order" 510 as a terminal node, a dish slot [SL:dish] 515, an n-gram "and" 520 as a terminal node, a dish slot [SL:dish] 525, and a name slot [SL:name] 530. In particular embodiments, each of the one or more non-terminal nodes associated with the one or more slots may have one or more child nodes. The one or more child nodes may comprise one or more of: a node associated with one of the one or more hidden intents; or a node associated with one of the one or more n-grams. In particular embodiments, the node associated with one of the one or more hidden intents being as a child node of a slot may be a constraint in how the assistant system 140 handles the hidden intents, which may lead to a more accurate understanding of a user input. As an example and not by way of limitation, the child nodes of the node [SL:dish] 515 in FIG. 5 may comprise an n-gram "a" 535 as a terminal node, a name slot [SL:name] 540, an n-gram "with" 545 as a terminal node, an ingredient slot [SL:ing] 550, an n-gram "and" 555 as a terminal node, and an ingredient slot [SL:ing] 550. As another example and not by way of limitation, the child node of the node [SL:name] 540 in FIG. 5 may comprise an n-gram "pizza" 575 as a terminal node; the child node of the node [SL:ing] 550 in FIG. 5 may comprise an n-gram "onions" 580 as a terminal node; the child node of the node [SL:ing] 560 in FIG. 5 may comprise an n-gram "olives" 585 as a terminal node; the child node of the node [SL:dish] 525 in FIG. 5 may comprise a number slot [SL:num] 565; the child node of the node [SL:num] 565 in FIG. 5 may comprise an n-gram "two" 590 as a terminal node; and the child node of the node [SL:name] 530 in FIG. 5 may comprise an n-gram "cans of coke" 570 as a terminal node. Generating the output of the compositional model in a nested tree-structure of intents and slots that can easily be understood by the downstream components by mapping them to executable API calls and are compatible with the widely used intent and slot execution systems may be an effective solution for addressing the technical challenge of providing the result obtained from the compositional model to other modules of the assistant system 140 in an executable format. Although this disclosure describes particular tree representations in a particular manner, this disclosure contemplates any suitable tree representations in any suitable manner.

FIG. 6 illustrates another example tree-structured representation for another example user input "directions to the Eagles game". As displayed in FIG. 6, the root node of the tree-structured representation may comprise an overall intent of [IN:get_directions(location)] 605. The child nodes of the root node may comprise an n-gram "directions" 610 as a terminal node, another n-gram "to" 615 as another terminal node, and a location slot [SL:location] 620. The child node of the node [SL:location] 620 may comprise a hidden intent [IN:get_event(name)] 625 (i.e., getting event information such as location). The child nodes of the node [IN:get_event(name)] 625 may comprise an n-gram "the" 630, a name slot [SL:name] 635, and a type slot [SL:type] 640. The child node of the node [SL:name] 635 may comprise an n-gram "eagles" 645 as a terminal node. The child node of the node [SL:type] 640 may comprise an n-gram "game" 650 as a terminal node. Although this disclosure describes particular tree representations in a particular manner, this disclosure contemplates any suitable tree representations in any suitable manner.

In particular embodiments, the compositional model may be trained based on a plurality of training samples associated with one or more domains. If the plurality of training samples are associated with one domain, the resulted compositional model may be domain specific. In particular embodiments, the assistant system 140 may train a plurality of domain-specific compositional models corresponding to a plurality of domains, respectively. When receiving a user input, the assistant system 140 may identify a domain associated with the user input based on a domain classifier, which may be trained based on one or more machine-learning models. The assistant system 140 may further select a compositional model from the plurality of compositional models based on the identified domain. If the plurality of training samples are associated with a plurality of domains, the resulted compositional model may be generative. The generative compositional model may be able to understand a plurality of nested user input associated with the plurality of domains. When receiving a user input, the assistant system 140 may process the user input with the generative compositional model without the domain classifier. Although this disclosure describes training particular compositional models in a particular manner, this disclosure contemplates training any suitable compositional models in any suitable manner.

In particular embodiments, the assistant system 140 may provide the generated feature vector to a dialog engine 235. The dialog engine 235 may resolve the user input based on the feature vector. In particular embodiments, resolving the user input may comprise one or more of: resolving one or more entities associated with the user input; requesting one or more agents to execute one or more tasks based on the user input; or generating an output based on the user input. The generated output may be provided to a CU composer 270. A technical advantage of generating the aforementioned feature vector, therefore, may include fast response to a nested user input as it is efficient to process vector-based representations with different modules of the assistant system 140. Although this disclosure describes using particular feature vectors in a particular manner, this disclosure contemplates using any suitable feature vectors in any suitable manner.

Figure 7:
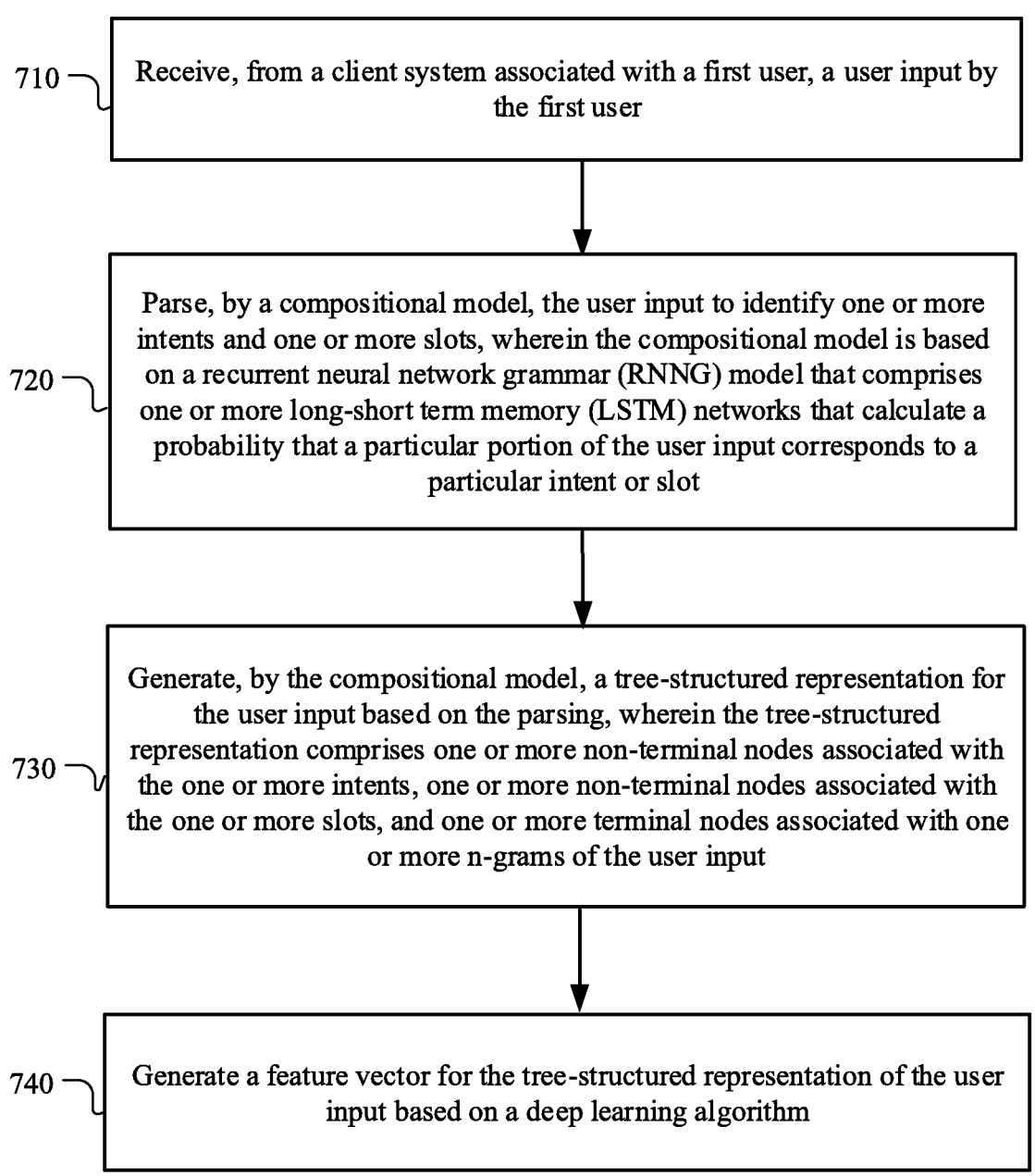
FIG. 7 illustrates an example method for understanding a nested user input.

FIG. 7 illustrates an example method 700 for understanding a nested user input. The method may begin at step 710, where the assistant system 140 may receive, from a client system 130 associated with a first user, a user input by the first user. At step 720, the assistant system 140 may parse, by a compositional model, the user input to identify one or more intents and one or more slots, wherein the compositional model is based on a recurrent neural network grammar (RNNG) model that comprises one or more long-short term memory (LSTM) networks that calculate a probability that a particular portion of the user input corresponds to a particular intent or slot. At step 730, the assistant system 140 may generate, by the compositional model, a tree-structured representation for the user input based on the parsing, wherein the tree-structured representation comprises one or more non-terminal nodes associated with the one or more intents, one or more non-terminal nodes associated with the one or more slots, and one or more terminal nodes associated with one or more n-grams of the user input. At step 740, the assistant system 140 may generate a feature vector for the tree-structured representation of the user input based on a deep learning algorithm. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for understanding a nested user input, including the particular steps of the method of FIG. 7, this disclosure contemplates any suitable method for understanding a nested user input, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Execution Engine for Compositional Entity Resolution

In particular embodiments, the assistant system 140 may resolve nested user inputs using a dialog engine of the assistant system 140. The assistant system 140 may occasionally receive nested user inputs to process. To do so, the assistant system 140 first uses a compositional model within the NLU module 220 to parse the user input to a query command by identifying an overall intent for the request, multiple slots (i.e., entities or subjects), and one or more hidden intents within the multiple slots within a single domain or across multiple domains. In particular embodiments, the assistant system 140 may receive the user input in the form of a text input (e.g., "Gas station near Kim's mom's house") and convert it into a block structure (e.g., [Gas station near [[[Kim's] mom's] house]]). The block structure may include terminal nodes to represent the n-grams and non-terminal nodes that represent the slots and intents. The conversion of the user input into a block structure helps prioritize which slot and/or intent to resolve first. As an example and not by way of limitation, for a user input "Gas station near Kim's mom's house," the assistant system 140 may identify the following query constraints for the query command: an overall intent as [IN:find_location ("Gas station")], a hidden intent as [IN:find_location ("Kim's mom's house")], a contact slot [SL:contact ("Kim's")], a relation slot [SL:relation("mom's")], a type slot [SL:type("house")], and an overall location slot [SL:location("Kim's mom's house")]. By identifying the overall intents, the assistant system 140 may identify what information the user is requesting with the nested user input. The hidden intents (i.e., inner queries) may direct the assistant system 140 to determine further information prior to resolving the overall intent (i.e., outer query). With the example block structure described above, the assistant system 140 may resolve the hidden intent first by finding the location associated with "Kim's mom's house." In order to find the location associated with the overall location slot [SL:location("Kim's mom's house")], the assistant system 140 may determine who is Kim and proceeds to determine who Kim's mom is, and finally the home address of Kim's mom. The assistant system 140 may use first-party agents and/or third-party agents to resolve the entities associated with the slots. Additionally, the assistant system 140 may check the appropriate privacy settings to ensure that the information is available to the user (e.g., Kim and the querying user are friends, Kim's mom and the user are friends, and Kim's mom shares her location with her friends on the online social network). Continuing the example, the assistant system 140 may use a social graph to identify the contact, Kim, use the social graph to find who resolves the mom relation with Kim, and identify the home address location associated with Kim's mom. After resolving the hidden intent [IN:find_location("Kim's mom's house")], the assistant system 140 may proceed to the overall intent [IN:find_location("Gas station")] by accessing a third-party agent and determining the closest gas station to the geographic location associated with Kim's mom's house. After the query command is fully resolved, the output may be provided to the CU composer 270, which can generate a response to present to the querying user. Although this disclosure describes resolving nested user inputs in a particular manner, this disclosure contemplates resolving nested user inputs in any suitable manner.

In particular embodiments, the assistant system 140 may receive a user input from a user of a client system 130. In particular embodiments, the user may interact with a client system 130 that forwards the user input to the assistant system 140 via the network 110. In particular embodiments, the user may be a user of an online social network. In particular embodiments, the user input may comprise a plurality of n-grams. As an example and not by way of limitation, the user input may be "directions to Kim's mom's house." As described above, in particular embodiments, the assistant system 140 may generate a tree-structured representation for the user input based on a parsing by a compositional model. The tree-structured representation may comprise non-terminal nodes associated with intents, non-terminal nodes associated with slots, and terminal nodes associated with n-grams. In particular embodiments, each slot has a slot type of a plurality of slot types. As an example and not by way of limitation, a slot [SL:location("home")] may have a location slot type and a slot [SL:event ("Music Festival")] may have an event slot type. In particular embodiments, the tree-structured representation may comprise an overall intent and one or more hidden intents. A hidden intent may be a child non-terminal node of at least one other non-terminal node parent. The overall intent may be the non-terminal parent node that all of the child non-terminal nodes feed into (e.g., the root node). Although this disclosure describes receiving a user input and generating a tree-structured representation in a particular manner, this disclosure contemplates receiving a user input and generating a tree-structured representation in any suitable manner.

In particular embodiments, the assistant system 140 may resolve the tree-structured representation. The assistant system 140 may apply a depth-first search algorithm to resolve the tree-structured representation. In particular embodiments, the assistant system 140 may resolve lowest level child non-terminal nodes first and proceed up through the tree-structured representation. As an example and not by way of limitation, for a user input, "directions to Kim's mom's house" the assistant system 140 may generate a tree-structured representation that would correspond to the block structure, [directions to [[[Kim's] mom's] house]], where the lowest level of the tree-structured representation corresponds to the innermost brackets (i.e., "Kim"). The assistant system 140 may proceed to resolve each level of the tree-structured representation and progress up the tree-structured representation. By proceeding through each level, the assistant system 140 may resolve the hidden intents prior to the overall intent. In particular embodiments, the assistant system 140 may resolve intents and slots on the same level from left-to-right. In particular embodiments, the tree-structured representation may comprise a non-resolvable non-terminal node associated with a slot. As an example and not by way of limitation, for the user input "find gas stations with a coffee shop in them," the assistant system 140 may not readily know what the n-gram "them" refers to when resolving the tree-structured representation. In particular embodiments, when the assistant system 140 attempts to resolve a non-resolvable non-terminal node, the assistant system 140 may generate partial slot information associated with the non-resolvable non-terminal node. In particular embodiments, the partial slot information may be passed to the non-terminal parent node to be partially resolved. In particular embodiments, the assistant system 140 may return to resolve the non-resolvable non-terminal node based on the associated partially resolved non-terminal parent node. In particular embodiments, to resolve the non-resolvable non-terminal node the assistant system 140 may identify one or more contexts associated with the one or more n-grams associated with the non-resolvable non-terminal node. The assistant system 140 may proceed to exchange the one or more n-grams associated with the non-resolvable non-terminal node with one or more n-grams based on the identified context. After exchanging the n-grams, in particular embodiments, the assistant system 140 may resolve the non-resolvable non-terminal node based on the exchanged n-grams. In particular embodiments, the assistant system 140 may query the entity resolution module 240 for entity information for a non-terminal node associated with a slot. The assistant system 140 may receive entity identifiers for each resolvable slot. In particular embodiments, the assistant system may identify one or more first-party agents and third-party agents 250, 255 associated with an intent of a non-terminal node. The assistant system 140 may rank the identified one or more agents 250, 255 for the intent. In particular embodiments, the assistant system 140 may rank the agents for each intent based on one or more of the semantic-intents, the slots associated with the intent, and the contexts associated with the slots. After performing the ranking the assistant system 140 may query the agents based on their ranking. In particular embodiments, the query comprises one or more entity identifiers associated with a non-terminal child node of the non-terminal node associated with the intent or the partial slot information associated with the non-terminal child node of the non-terminal node associated with the intent. In particular embodiments, the assistant system 140 may generate resolve information for each non-terminal node. In particular embodiments, a non-terminal parent node may be non-resolvable based on the slot type associated with the non-terminal child node. As an example and not by way of limitation, for an intent [IN:find_location(location_1)] that requires a location slot type, but the associated slot has an event slot type, the assistant system 140 may change the slot types based on the parameters for the intent associated with the non-terminal parent node as shown in FIG. 6. In particular embodiments, the assistant system 140 may check to determine whether the information from a resolved non-terminal node is accessible to the user based on privacy settings associated with the information. As an example and not by way of limitation, for the user input "directions to Kim's mom's house," the assistant system 140 may resolve the user input to provide directions to the location associated with Kim's mom's house. However, that information (e.g., Kim's mom's home address) may not be public information and the user may be determined to not have access to that information (e.g., the user is not friends with Kim's mom or connected to Kim's mom on an online social network). In particular embodiments, a non-resolvable non-terminal node may be associated with two or more entities. As an example and not by way of limitation, the user may be connected to two users named "Kim." In particular embodiments, the partial slot information associated with the non-resolvable non-terminal node may comprise entity identifiers of the entities associated with the non-resolvable non-terminal node. In particular embodiments, the assistant system 140 may send instructions to present a prompt for the user to select which entity the user meant to refer to when the assistant system 140 identifies a non-resolvable non-terminal node associated with a slot. As an example and not by way of limitation, the assistant system 140 may send a request for a further user input to specify which entity the user meant. The assistant system 140 may proceed to resolve the non-resolvable non-terminal node using the entity identifier of the entity selected by the user. In particular embodiments, the assistant system 140 may select the entity when two or more entities are associated with a non-resolvable non-terminal node based on a comparison of social signals between the user and each of the entities. As an example and not by way of limitation, if a user is connected to one user of the online social network named "Kim Black" and is also connected to another user of the online social network named "Kim Jones," the assistant system 140 may determine which Kim the user interacts with more. As another example and not by way of limitation, the assistant system 140 may determine which Kim the user sends messages and share posts with more. In particular embodiments, the assistant system 140 may resolve the non-resolvable non-terminal node based on the entity identifier of the selected entity. Although this disclosure describes resolving the tree-structured representation in a particular manner, this disclosure contemplates resolving the tree-structured representation in any suitable manner.

In particular embodiments, the assistant system 140 may generate a response to the user input based on the resolved tree-structured representation. The assistant system 140 may provide the answer to the user input if the user input is a user query. As an example and not by way of limitation, if the user input is "directions to the Eagles game," the assistant system 140 may provide step-by-step instructions to travel to the Eagles game. In particular embodiments, the assistant system 140 may perform an action in response to resolving the tree-structured representation. As an example and not by way of limitation, the user input may be "call John's mom hands free," and the assistant system 140 may send instructions to the client system 130 to perform the action of calling John's mom after identifying the phone number associated with John's mom. As another example and not by way of limitation, the assistant system 140 may access a navigation application to provide directions in response to receiving a user input, "directions to the Eagles game." Although this disclosure describes generating a response to the user input in a particular manner, this disclosure contemplates generating a response to the user input in any suitable manner.

In particular embodiments, the assistant system 140 may send instructions to the client system 130 to present the response. After resolving the user input by resolving the tree-structured representation, the assistant system 140 may provide a response to the user. As an example and not by way of limitation, the assistant system 140 may present the response in a messaging interface in response to a text user input, or emit the response as an audio clip via a speaker on the client system 130. In particular embodiments, the response may comprise an activatable link for performing a task associated with fulfilling the user input. As an example and not by way of limitation, if the user input is a text input of "directions to Kim's mom's house," the assistant system 140 may generate an activatable link for the user to activate to perform a context switch within the client system 130 to a navigation application with the directions. As another example and not by way of limitation, if the user input is a voice input of "directions to Kim's mom's house," the assistant system 140 may generate an audio clip describing the directions. Although this disclosure describes sending instructions to present a response in a particular manner, this disclosure contemplates sending instructions to present a response in any suitable manner.

Figure 8:
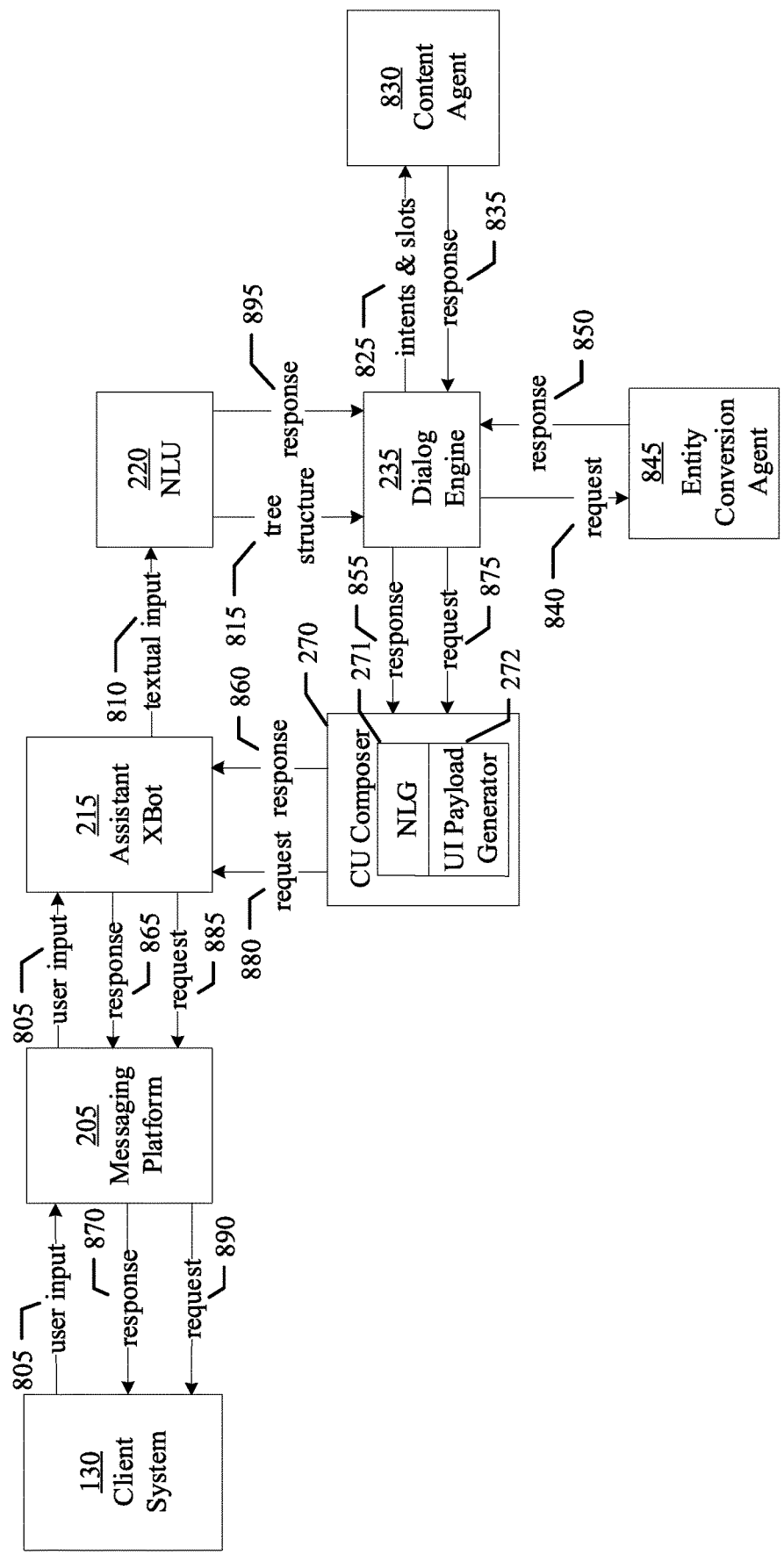
FIG. 8 illustrates an example diagram flow of resolving nested user inputs.

FIG. 8 illustrates an example diagram flow 800 of resolving a nested user input through a tree-structured representation based on the example architecture 200 of the assistant system 140 in FIG. 2. The process begins with the client system 130 receiving a user input 805 from a user. In particular embodiments, the messaging platform 205 may receive the user input 805 from the client system 130. The user input 805 may comprise one or more of a character string, an audio clip, an image, or a video clip. In particular embodiments, the assistant xbot 215 may receive the user input 805 from the messaging platform 205. The assistant xbot 215 may generate a textual input 810 from the user input 805. In particular embodiments, the assistant xbot 215 may send the textual input 810 to the NLU module 220. The NLU module 220 may identify one or more intents and one or more slots based on the textual input 810 of the user input 805. After identifying the intents and slots, the NLU module 220 may generate a tree-structured representation 815 of the textual input 810. In particular embodiments, the tree-structured representation 815 may indicate the overall intent, hidden intents, and slots of the user input 805. In particular embodiments, the NLU 220 may send the tree-structured representation 815 to the dialog engine 235. The dialog engine 235 may process the tree-structured representation 815 and send the intents and slots 825 to the content agent 830. In particular embodiments, the content agent 830 may represent a first-party agent 250 or a third-party agent 255. The content agent 830 may resolve the intents and slots 825 and send back a response 835. The response 835 may comprise information associated with the resolved intents and slots 825. As an example and not by way of limitation, a user input "directions to Kim's mom's house" may be parsed to identify an overall intent [IN:find_directions(current location, "Kim's mom's house")], a hidden intent as [IN:find_location ("Kim's mom's house")], a contact slot [SL:contact ("Kim's")], a relation slot [SL:relation ("mom's")], and a type slot [SL:type ("house")]. The dialog engine 235 may call the entity resolution module 240 to resolve the slots in conjunction with resolving the intents with the content agent 830. In particular embodiments, the dialog engine 235 may send the identified slots in the tree-structured representation 815 to the entity resolution module 240. The entity resolution module 240 may identify an entity associated with a slot and calculate a confidence score in how likely the n-gram(s) are associated with the identified entity. In particular embodiments, if the confidence score falls below a threshold confidence score, then the entity resolution module 240 may classify the slot as non-resolvable. In particular embodiments, the dialog engine 235 may select an entity based on the confidence score to be associated with a slot. In particular embodiments, for specific n-grams, the entity resolution module 240 may determine the specific n-grams as non-resolvable. As an example and not by way of limitation, n-grams such as "it, them, etc." may be classified as non-resolvable. In particular embodiments, the dialog engine 235 may resolve each slot iteratively based on an identified order associated with the tree-structured representation 815. In particular embodiments, the dialog engine 235 may attempt to resolve each slot simultaneously and select an order of resolved slots that yield the best results. In particular embodiments, an order of resolving slots may be based on slot type. In particular embodiments, resolving the slots may generate entity identifiers for resolving the intents associated with the slots. In particular embodiments, resolving the slots may generate partial slot information to be based to the content agent 830 to partially resolve an intent associated with the partial slot information. In particular embodiments, the dialog engine 235 may resolve the intents and slots 825 iteratively with the content agent 830. As an example and not by way of limitation, the dialog engine 235 may resolve the hidden intents prior to the overall intent. In particular embodiments, the intents that are deeper in the tree-structured representation 815 may be resolved prior to intents higher up in the tree-structured representation 815. In particular embodiments, the response 835 may comprise information of the resolved intents. In particular embodiments, the dialog engine 235 may send a request 840 to the entity conversion agent 845 to change a slot type of a slot from one type to another type. In particular embodiments, the request 840 may comprise a current slot type to convert to a new slot type and an intent associated with the slot. In particular embodiments, the entity conversion agent 845 may determine which slot type a slot needs to be converted to based on the intent associated with the slot. As an example and not by way of limitation, for an intent [IN:find_location ("Eagles Game")], the slot may initially be an event slot, but may need to be converted to a location slot in order to identify the location associated with the "Eagles Game." In particular embodiments, the entity conversion agent 845 may resolve the request 840 and send back a response 850 comprising the new slot type associated with the received slot. In particular embodiments, the entity conversion agent 845 may also resolve the slot and send an entity identifier associated with the slot and/or more information (e.g., a location). In particular embodiments, the dialog engine 235 may receive the response 850 and forward the intent with the converted slot to the content agent 830 to resolve. After resolving the intents and slots 825, the dialog engine 235 may send a response 855 to the user input 805 to the CU composer 270. The response 855 may comprise instructions to present the information that resolves the user input 805. The CU composer 270 may generate a response 860 comprising information that resolves the user input 805. The CU composer 270 may forward the response 860 to the assistant xbot 215. In particular embodiments, the assistant xbot 215 may send the response 865 comprising information that resolves the user input 805 to the messaging platform 205. In particular embodiments, the messaging platform 205 may send the response 870 comprising information that resolves the user input 805 to the client system 130 to present to the user. In particular embodiments, responses 860, 865, 870 may comprise instructions for the client system 130 to present information that resolves the user input 805.

In particular embodiments, the dialog engine 235 may send a request 875 for more information from the user of the client system 130 to the CU composer 270. In particular embodiments, the request 875 may be for a non-resolvable non-terminal node associated with a slot. As an example and not by way of limitation, a slot may be associated with two or more entities and the dialog engine 235 may send the request 875 to clarify which entity the user intended. In particular embodiments, the dialog engine 235 may prioritize an entity and incorporate the entity within the response 855 to clarify which entity the dialog engine 235 selected. The request 875 may comprise one or more entities to be resolved. In particular embodiments, the CU composer 270 may generate a request 880 to send to the user of the client system 130 to present the request 875 in a format the user will understand. In particular embodiments, the CU composer 270 may send the request 880 to the assistant xbot 215. The assistant xbot 215 may forward the request 885 to the messaging platform 205. In particular embodiments, the messaging platform 205 may forward the request 890 to the client system 130. The user may respond back with another user input 805 that includes the response to the request 890. The user input 805 may be passed through the messaging platform 205 and the assistant xbot 215 to the NLU module 220. In particular embodiments, the NLU module may generate a response 895 to the request 890 to present to the dialog engine 235. In particular embodiments, the dialog engine 235 may follow up and resolve the intents and slots associated with the response 895. The dialog engine 235 may follow up and generate a response to the original user input 805 with the requested information and forward the response to the client system 130 as described above.

Figure 9:
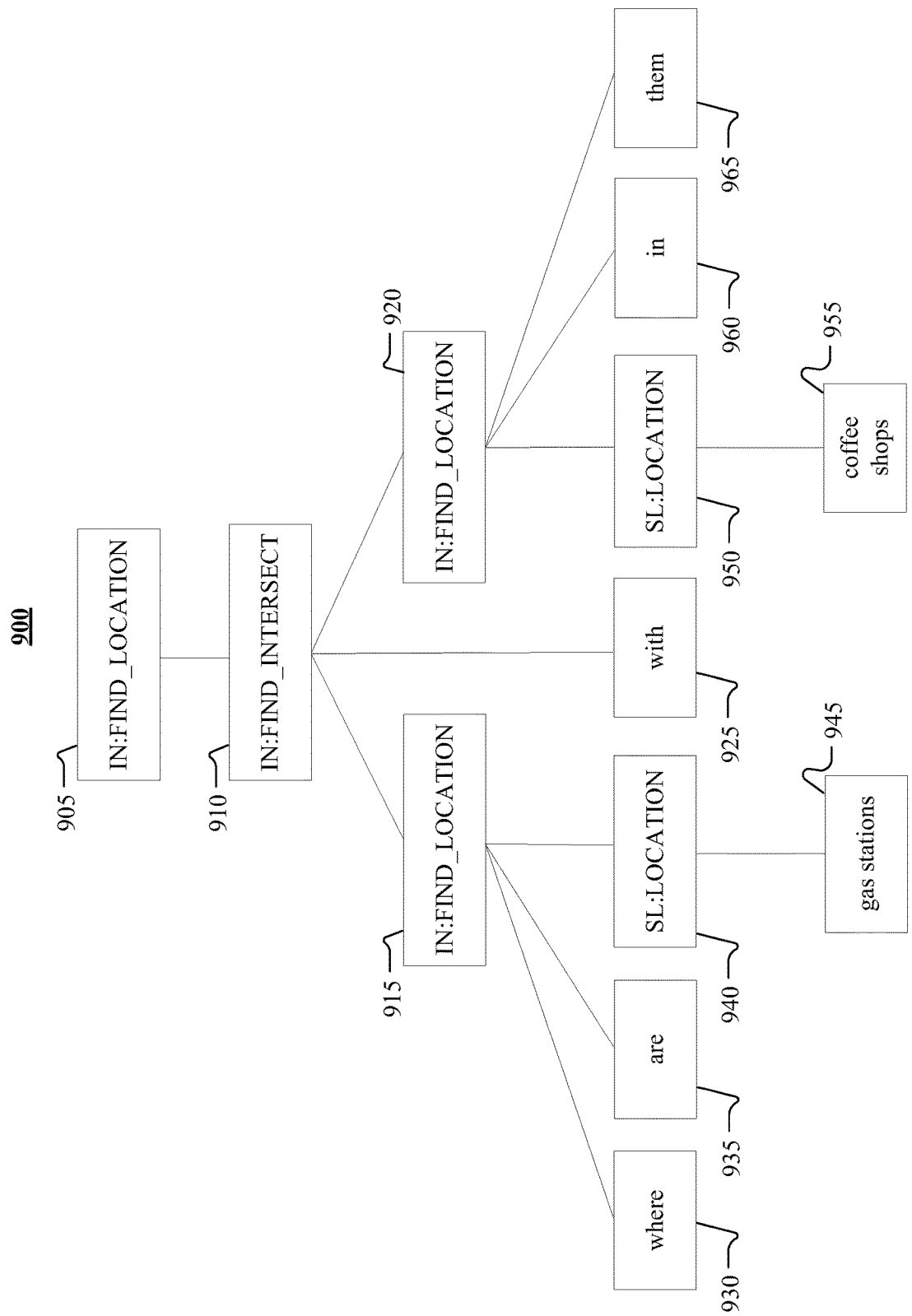
FIG. 9 illustrates another example parsing result of another user input.

FIG. 9 illustrates another example of a tree-structured representation 900 for example user inputs. FIG. 9 includes the tree-structured representation 900 of the example user input, "where are gas stations with coffee shops in them". In particular embodiments, the user input may be received as a text input into a messaging application with the assistant system 140. In particular embodiments, the user input may be received as an audio input that may be sent to the assistant system 140 or converted to a text input prior to sending to the assistant system 140. As displayed in FIG. 9, the root node of the tree-structured representation 900 may comprise an overall intent of [IN:find_location(location)] 905. The child node of the root node may comprise a hidden intent [IN:find_intersect(location_1, location_2)] 910. The child nodes of the hidden intent [IN:find_intersect(location_1, location_2)] 910 may comprise a hidden intent [IN:find_location(location_1)] 915 and another hidden intent [IN:find_location(location_2)] 920 and an n-gram "with" 925. The child nodes of the hidden intent [IN:find_location(location 1)] 915 may comprise an n-gram "where" 930 as a terminal node, another n-gram "are" 935 as another terminal node, and a location slot 940. The child node of the node [SL: location] 940 may comprise an n-gram "gas stations" 945. The child nodes of the hidden intent [IN:find_location (location_2)] 920 may comprise a location slot 950, an n-gram "in" 960, and an n-gram "them" 965. The child node of the node 950 may comprise the n-gram "coffee shops" 955. Although this disclosure describes particular tree representations in a particular manner, this disclosure contemplates any suitable tree representations in any suitable manner.

In particular embodiments, the assistant system 140 may resolve the tree-structured representation by going through and iteratively resolving the intents and slots identified in the tree-structured representation. The assistant system 140 may initially identify the intents 905, 910, 915, 920 based on the n-grams of the user input. As an example and not by way of limitation, the n-grams "where," 930 "are," 935 and "gas stations" 945 may be used to determine an intent [IN: find_location(location_1)] 915. The assistant system 140 may proceed to first resolve the location slot 940 by querying an entity resolution module 240. The entity resolution module 240 may provide an entity identifier associated with one or more entities that resolve the location slot 940. As an example and not by way of limitation, the entity resolution module 240 may retrieve entity identifiers of gas stations close by the querying user (e.g., close to the client system 130). The assistant system 140 may proceed to resolve the location slot 950 by querying the entity resolution module 240. As an example and not by way of limitation, the entity resolution module 240 may retrieve entity identifiers of coffee shops close by the querying user. The entity identifiers of the slots 940, 950 may be passed up to their respective intents 915, 920. The assistant system 140 may query a content agent 830 to resolve the intents 915, 920. In particular embodiments, the intents 915, 920 may be partially resolved when the assistant system 140 cannot resolve an n-gram. As an example and not by way of limitation, the n-gram "them" 965 may not be readily identified in the context of the intent 920. As such, as an example and not by way of limitation, the partial user input "coffee shops in them" may not be resolved because there is no understanding of "them." The assistant system 140 may proceed to pass partial slot information up to the parent node (i.e., the intent 920). When processing the user input, the assistant system 140 may return to the n-gram "them" 965 and replace it appropriately with another n-gram to resolve the user input. As an example and not by way of limitation, given the context of the user input, the assistant system 140 may replace the n-gram "them" 965 with the n-gram "gas stations" 945. The assistant system 140 may proceed to resolve the intents 915, 920 after exchanging the n-grams. The output of the intents 915, 920 may be geographic coordinates associated with one or more entities. In particular embodiments, the assistant system 140 may resolve the intent 910 after resolving the intents 915, 920. The assistant system 140 may use the geographic coordinates to input into the intent [IN:find_intersect(location_1, location_2)] 910 to find an intersect of which gas stations nearby have a coffee shop. The assistant system 140 may pass the results of the intent 910 to the overall intent 905 to find a geographic location of the intent 910. The assistant system 140 may proceed to send instructions to the client system 130 to present the results of the user input.

Figure 10:
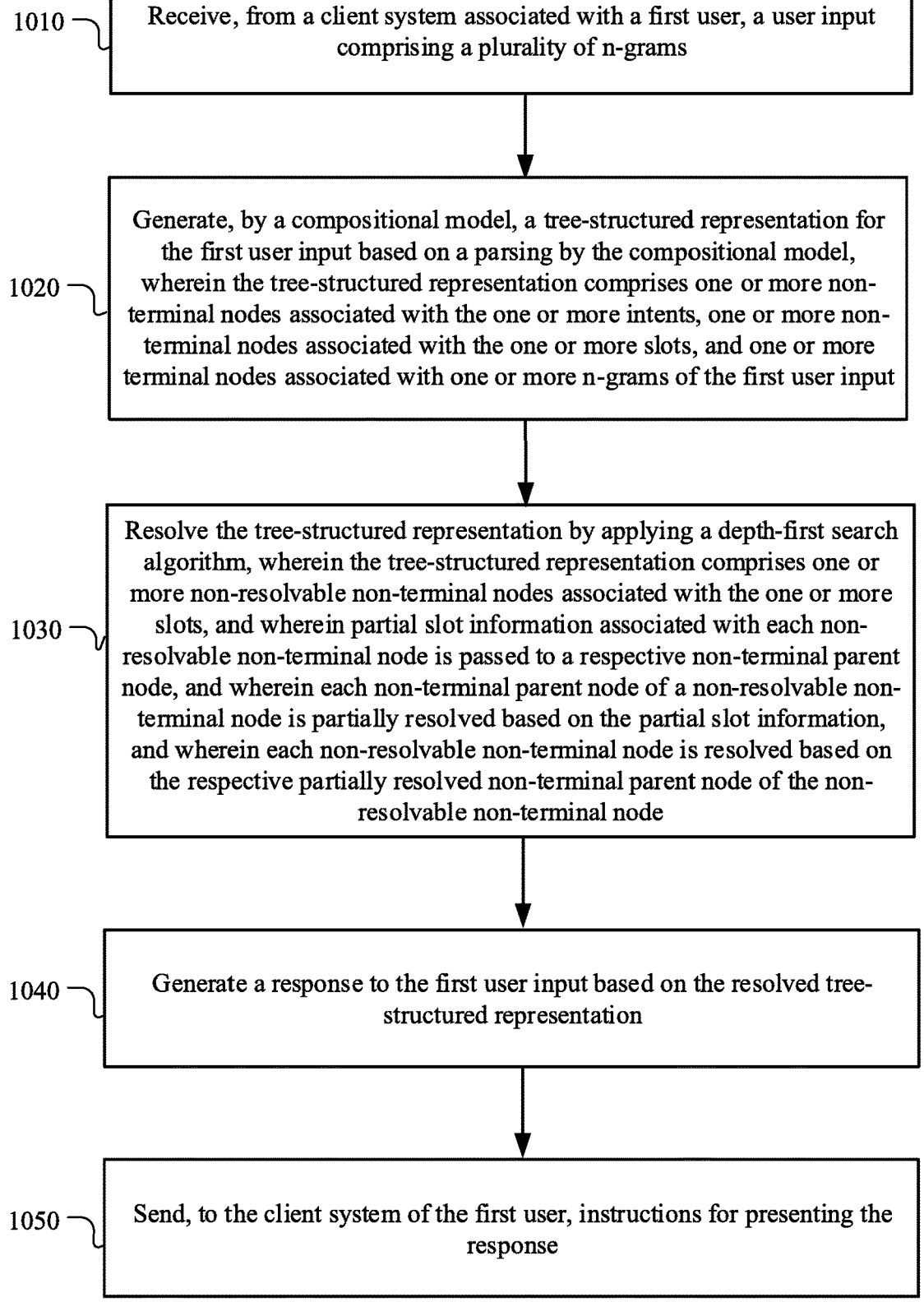
FIG. 10 illustrates an example method for resolving nested user inputs.

FIG. 10 illustrates an example method 1000 for resolving nested user inputs. The method may begin at step 1010, where the assistant system 140 may receive a user input comprising a plurality of n-grams from a first user of a client system 130. In particular embodiments, the first user may be a user of an online-social network. At step 1020, the assistant system 140 may generate, by a compositional model, a tree-structured representation for the first user input based on a parsing by a compositional model. In particular embodiments, the tree-structured representation may comprise one or more non-terminal nodes associated with the one or more intents, one or more non-terminal nodes associated with the one or more slots, and one or more terminal nodes associated with one or more n-grams of the first user input. At step 1030, the assistant system 140 may resolve the tree-structured representation by applying a depth-first search algorithm. The tree-structured representation may comprise one or more non-resolvable non-terminal nodes associated with the one or more slots. The partial slot information associated with each non-resolvable non-terminal node may be passed to a respective non-terminal parent node. Each non-terminal parent node of a non-resolvable non-terminal node may be partially resolved based on the partial slot information. Each non-resolvable non-terminal node may be resolved based on the respective partially resolved non-terminal parent node of the non-resolvable non-terminal node. At step 1040, the assistant system 140 may generate a response to the first user input based on the resolved tree-structured representation. At step 1050, the assistant system 140 may send, to the client system of the first user, instructions for presenting the response. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for resolving nested user inputs including the particular steps of the method of FIG. 10, this disclosure contemplates any suitable method for resolving nested user inputs including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Social Graphs

Figure 11:
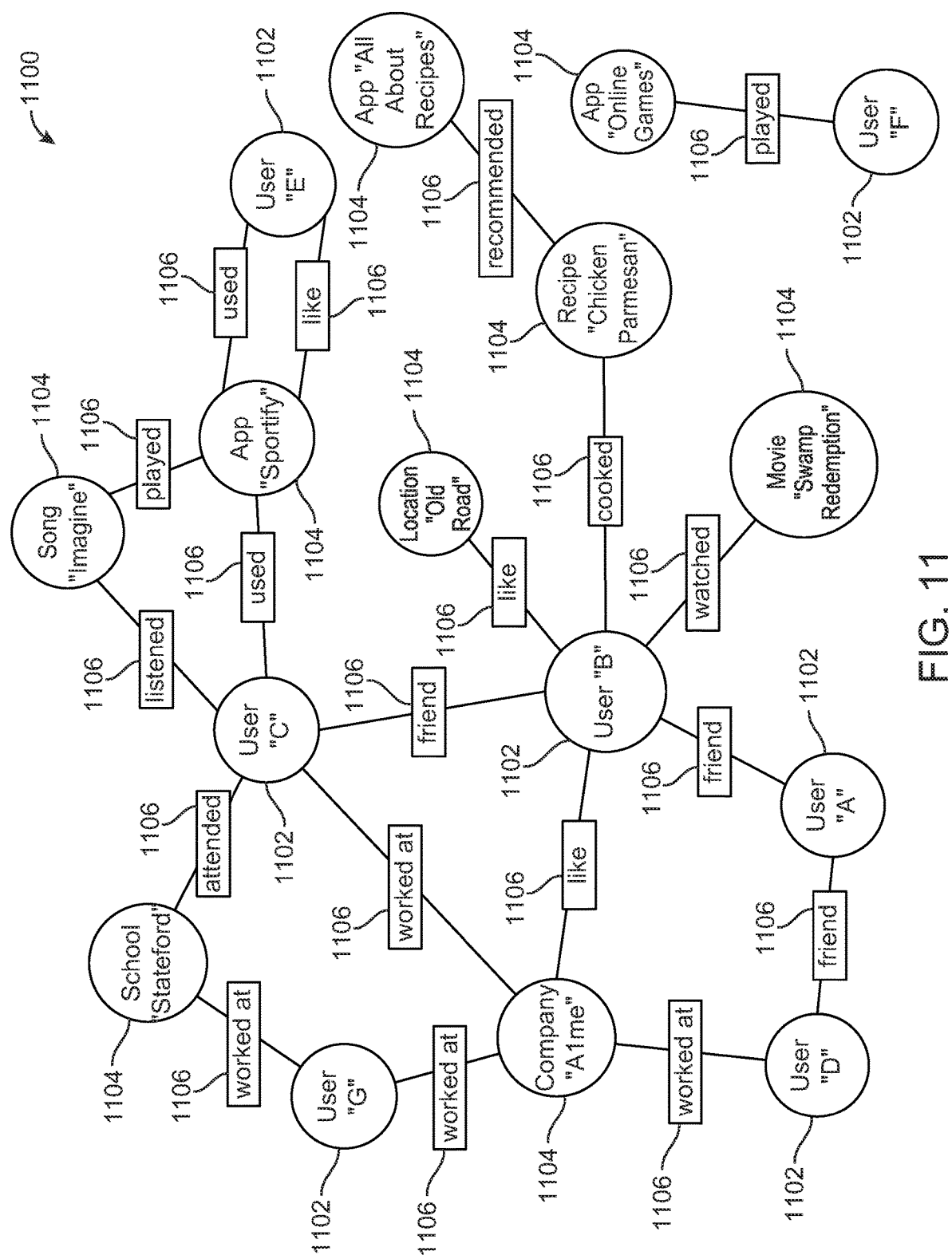
FIG. 11 illustrates an example social graph.

FIG. 11 illustrates an example social graph 1100. In particular embodiments, the social-networking system 160 may store one or more social graphs 1100 in one or more data stores. In particular embodiments, the social graph 1100 may include multiple nodes—which may include multiple user nodes 1102 or multiple concept nodes 1104—and multiple edges 1106 connecting the nodes. Each node may be associated with a unique entity (i.e., user or concept), each of which may have a unique identifier (ID), such as a unique number or username. The example social graph 1100 illustrated in FIG. 11 is shown, for didactic purposes, in a two-dimensional visual map representation. In particular embodiments, a social-networking system 160, a client system 130, an assistant system 140, or a third-party system 170 may access the social graph 1100 and related social-graph information for suitable applications. The nodes and edges of the social graph 1100 may be stored as data objects, for example, in a data store (such as a social-graph database). Such a data store may include one or more searchable or queryable indexes of nodes or edges of the social graph 1100.

In particular embodiments, a user node 1102 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with the social-networking system 160. In particular embodiments, a user node 1102 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more web interfaces.

In particular embodiments, a concept node 1104 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more web interfaces.

In particular embodiments, a node in the social graph 1100 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1104. Profile interfaces may be viewable by all or a selected subset of other users. As an example and not by way of limitation, a user node 1102 may have a corresponding user-profile interface in which the corresponding user may add content, make declarations, or otherwise express himself or herself. As another example and not by way of limitation, a concept node 1104 may have a corresponding concept-profile interface in which one or more users may add content, make declarations, or express themselves, particularly in relation to the concept corresponding to concept node 1104.

In particular embodiments, a concept node 1104 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1102 corresponding to the user and a concept node 1104 corresponding to the third-party web interface or resource and store edge 1106 in one or more data stores.

In particular embodiments, a pair of nodes in the social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1106 connecting the first user's user node 1102 to the second user's user node 1102 in the social graph 1100 and store edge 1106 as social-graph information in one or more of data stores 164. In the example of FIG. 11, the social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile interface corresponding to a concept node 1104 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, the social-networking system 160 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104).

In particular embodiments, the social-networking system 160 may create an edge 1106 between a user node 1102 and a concept node 1104 in the social graph 1100. As an example and not by way of limitation, a user viewing a concept-profile interface (such as, for example, by using a web browser or a special-purpose application hosted by the user's client system 130) may indicate that he or she likes the concept represented by the concept node 1104 by clicking or selecting a "Like" icon, which may cause the user's client system 130 to send to the social-networking system 160 a message indicating the user's liking of the concept associated with the concept-profile interface. In response to the message, the social-networking system 160 may create an edge 1106 between user node 1102 associated with the user and concept node 1104, as illustrated by "like" edge 1106 between the user and concept node 1104. In particular embodiments, the social-networking system 160 may store an edge 1106 in one or more data stores. In particular embodiments, an edge 1106 may be automatically formed by the social-networking system 160 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

Vector Spaces and Embeddings

Figure 12:
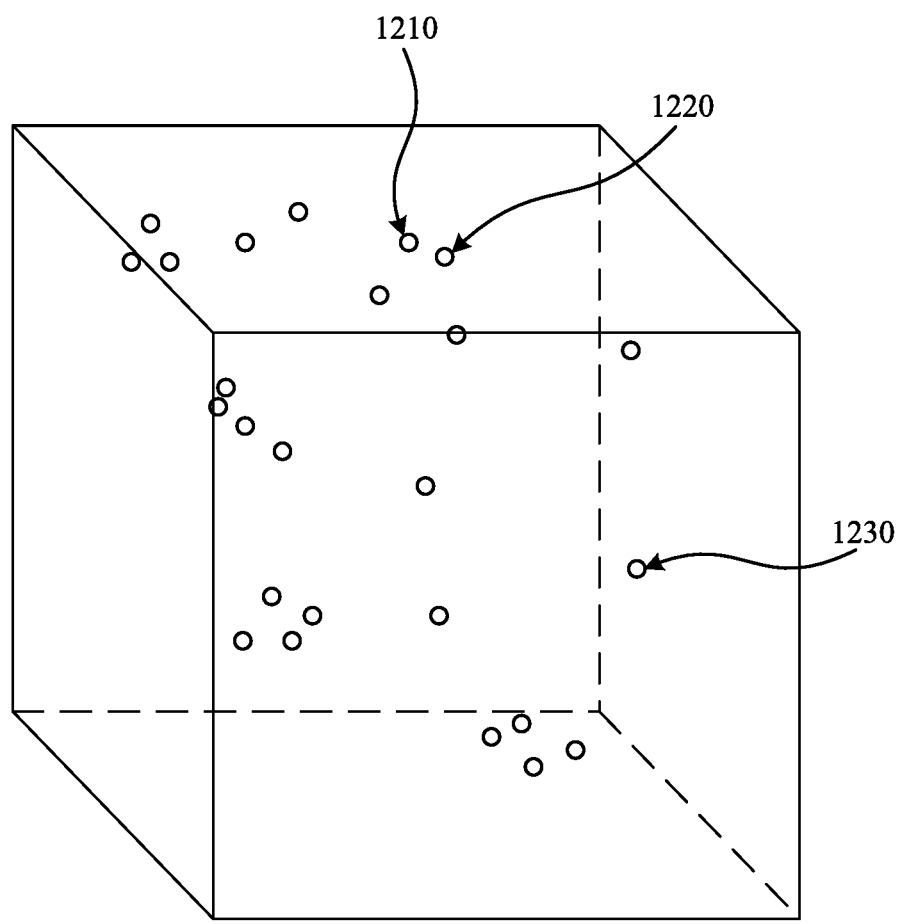
FIG. 12 illustrates an example view of an embedding space.

FIG. 12 illustrates an example view of a vector space 1200. In particular embodiments, an object or an n-gram may be represented in a d-dimensional vector space, where d denotes any suitable number of dimensions. Although the vector space 1200 is illustrated as a three-dimensional space, this is for illustrative purposes only, as the vector space 1200 may be of any suitable dimension. In particular embodiments, an n-gram may be represented in the vector space 1200 as a vector referred to as a term embedding. Each vector may comprise coordinates corresponding to a particular point in the vector space 1200 (i.e., the terminal point of the vector). As an example and not by way of limitation, vectors 1210, 1220, and 1230 may be represented as points in the vector space 1200, as illustrated in FIG. 12. An n-gram may be mapped to a respective vector representation. As an example and not by way of limitation, n-grams $t_1$ and $t_2$ may be mapped to vectors $\vec{v_1}$ and $\vec{v_2}$ in the vector space 1200, respectively, by applying a function $\vec{\pi}$ defined by a dictionary, such that $\vec{v_1}=\vec{\pi}(t_1)$ and $\vec{v_2}=\vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 1200. In particular embodiments, an n-gram may be mapped to a vector representation in the vector space 1200 by using a machine leaning model (e.g., a neural network). The machine learning model may have been trained using a sequence of training data (e.g., a corpus of objects each comprising n-grams).

In particular embodiments, an object may be represented in the vector space 1200 as a vector referred to as a feature vector or an object embedding. As an example and not by way of limitation, objects $e_1$ and $e_2$ may be mapped to vectors $\vec{v_1}$ and $\vec{v_2}$ in the vector space 1200, respectively, by applying a function $\vec{\pi}$, such that $\vec{v_1}=\vec{\pi}(e_1)$ and $\vec{v_2}=\vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1200. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1}-\vec{v_2}\|$. A similarity metric of two vectors may represent how similar the two objects or n-grams corresponding to the two vectors, respectively, are to one another, as measured by the distance between the two vectors in the vector space 1200. As an example and not by way of limitation, vector 1210 and vector 1220 may correspond to objects that are more similar to one another than the objects corresponding to vector 1210 and vector 1230, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 13:
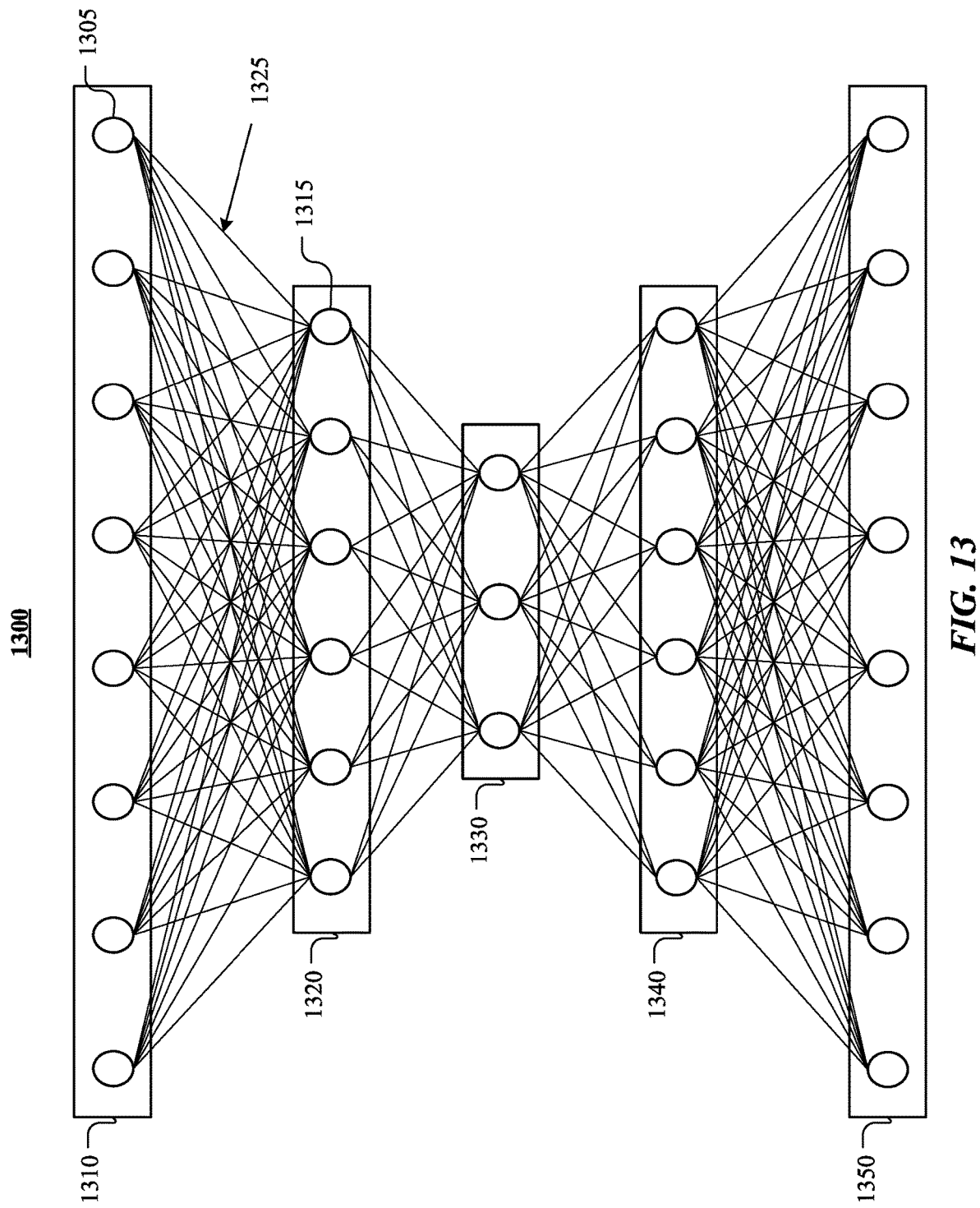
FIG. 13 illustrates an example artificial neural network.

FIG. 13 illustrates an example artificial neural network ("ANN") 1300. In particular embodiments, an ANN may refer to a computational model comprising one or more nodes. Example ANN 1300 may comprise an input layer 1310, hidden layers 1320, 1330, 1360, and an output layer 1350. Each layer of the ANN 1300 may comprise one or more nodes, such as a node 1305 or a node 1315. In particular embodiments, each node of an ANN may be connected to another node of the ANN. As an example and not by way of limitation, each node of the input layer 1310 may be connected to one of more nodes of the hidden layer 1320. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 13 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 13 depicts a connection between each node of the input layer 1310 and each node of the hidden layer 1320, one or more nodes of the input layer 1310 may not be connected to one or more nodes of the hidden layer 1320.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1320 may comprise the output of one or more nodes of the input layer 1310. As another example and not by way of limitation, the input to each node of the output layer 1350 may comprise the output of one or more nodes of the hidden layer 1360. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0,s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1325 between the node 1305 and the node 1315 may have a weighting coefficient of 0.4, which may indicate that 0.4 multiplied by the output of the node 1305 is used as an input to the node 1315. As another example and not by way of limitation, the output $y_k$ of node k may be $y_k=F_k(s_k)$, where $F_k$ may be the activation function corresponding to node k, $s_k=\Sigma_j (w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1300 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1104 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1100. A privacy setting may be specified for one or more edges 1106 or edge-types of the social graph 1100, or with respect to one or more nodes 1102, 1104 or node-types of the social graph 1100. The privacy settings applied to a particular edge 1106 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1104 connected to a user node 1102 of the first user by an edge 1106. The first user may specify privacy settings that apply to a particular edge 1106 connecting to the concept node 1104 of the object, or may specify privacy settings that apply to all edges 1106 connecting to the concept node 1104. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

Privacy Settings Based on Location

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Privacy Settings for User Authentication and Experience Personalization Information In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Systems and Methods

Figure 14:
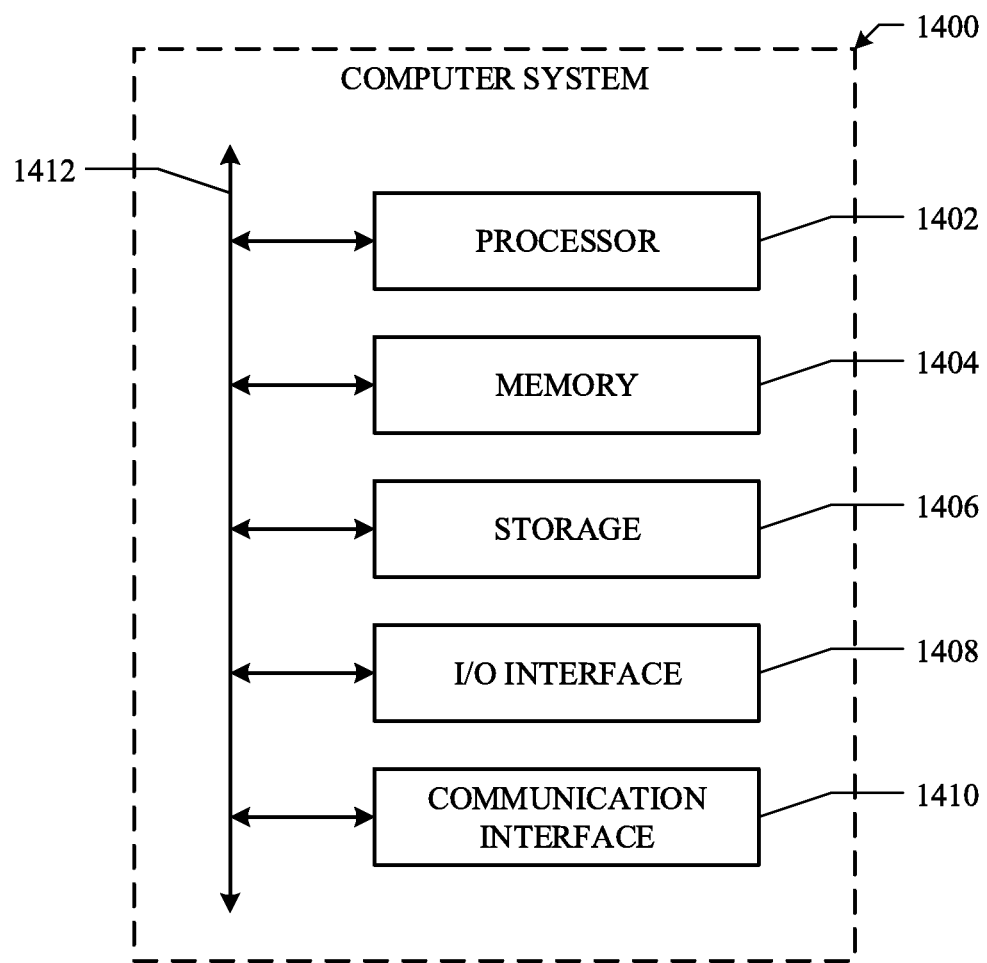
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    receiving, by the one or more computing systems from a client system associated with a first user, a first user input comprising a plurality of n-grams;
    generating, in response to receiving the first user input by a compositional model, a tree-structured representation for the first user input based on a parsing by the compositional model, wherein the tree-structured representation comprises one or more non-terminal nodes associated with one or more intents, one or more non-terminal nodes associated with one or more slots, and one or more terminal nodes associated with one or more n-grams of the first user input;
    resolving, by the one or more computing systems, the tree-structured representation by applying a depth-first search algorithm, wherein the tree-structured representation comprises one or more non-resolvable non-terminal nodes associated with the one or more slots, wherein each non-resolvable non-terminal node is associated with partial slot information corresponding to an n-gram that has not been resolved to a particular entity identifier, and wherein the partial slot information associated with each non-resolvable non-terminal node is passed to a respective non-terminal parent node, and wherein each non-terminal parent node of a non-resolvable non-terminal node is partially resolved based on the partial slot information, and wherein each non-resolvable non-terminal node is resolved based on the respective partially resolved non-terminal parent node of the non-resolvable non-terminal node;
    generating, by the one or more computing systems, a response to the first user input based on the resolved tree-structured representation; and
    sending, by the one or more computing systems to the client system of the first user, instructions for presenting the response.

2. The method of claim 1, wherein resolving each non-resolvable non-terminal node based on the respective partially resolved non-terminal parent node of the non-resolvable non-terminal node comprises:
    identifying one or more contexts associated with one or more first n-grams associated with the non-resolvable non-terminal node;
    exchanging one or more of the first n-grams associated with the non-resolvable non-terminal node with one or more second n-grams based on the identified one or more contexts; and
    resolving the non-resolvable non-terminal node based on the one or more second n-grams associated with the non-resolvable non-terminal node.

3. The method of claim 1, wherein each slot has a slot type of a plurality of slot types, and wherein resolving a non-terminal node associated with a particular slot of a first slot type comprises changing the first slot type to a second slot type.

4. The method of claim 3, wherein changing the first slot type to a second slot type is based on an intent associated with a non-terminal parent node of the non-terminal node associated with the particular slot.

5. The method of claim 1, wherein resolving the tree-structured representation comprises:
    querying the entity resolution module for entity information for each slot;
    receiving entity identifiers for each resolvable slot;
    generating the partial slot information responsive to being unable to resolve a slot.

6. The method of claim 5, wherein resolving the tree-structured representation comprises, for each intent:
    identifying one or more agents associated with the intent;
    ranking the one or more agents for the intent;
    querying one or more of the agents based on their respective ranks, wherein the query comprises (1) one or more entity identifiers associated with a non-terminal child node of the non-terminal node associated with the intent or (2) the partial slot information associated with the non-terminal child node of the non-terminal node associated with the intent; and
    generating resolved information for each non-terminal node.

7. The method of claim 6, wherein ranking the one or more agents for each intent is based on (1) the one or more semantic-intents, (2) the one or more slots associated with the intent, and (3) one or more contexts associated with the slots.

8. The method of claim 6, further comprising:
    determining, for each resolved information associated with a non-terminal node, whether the resolved information is accessible to the first user based on privacy settings associated with the resolved information.

9. The method of claim 1, wherein at least one of the non-resolvable non-terminal nodes has two or more entities are associated with it, and wherein the partial slot information associated with the at least one non-resolvable non-terminal node comprises entity identifiers of the two or more entities.

10. The method of claim 9, further comprising:
    sending, by the one or more computing systems to the client system of the first user, instructions for presenting a prompt requesting the user to select one of the two or more entities to be associated with the at least one non-resolvable non-terminal node; and resolving the at least one non-resolvable non-terminal node based on the entity identifier of the entity selected by the first user.

11. The method of claim 9, further comprising selecting one of the two or more entities to be associated with the at least one non-resolvable non-terminal node based on a comparison of social signals between the first user and each of the two or more entities; and resolving the at least one non-resolvable non-terminal node based on the entity identifier of the selected entity.

12. The method of claim 1, wherein the one or more intents comprise one or more hidden intents associated with one or more non-terminal nodes and an overall intent associated with a non-terminal parent node of the one or more non-terminal nodes, and wherein the one or more hidden intents are resolved prior to resolving the overall intent.

13. The method of claim 1, further comprising:
identifying a domain associated with the first user input; and
selecting the compositional model from a plurality of compositional models based on the identified domain, wherein the plurality of compositional models correspond to a plurality of domains, respectively.

14. The method of claim 1, wherein the compositional model is trained based on a plurality of training samples associated with one or more domains.

15. The method of claim 1, further comprising performing an action in response to resolving the tree-structured representation.

16. The method of claim 15, wherein the action comprises sending, to the client system of the first user, instructions to execute one or more tasks associated with fulfilling the first user input.

17. One or more computer-readable non-transitory storage media embodying software that is operable when executed to:
receive, by the one or more computing systems from a client system associated with a first user, a first user input comprising a plurality of n-grams;
generate, in response to receiving the first user input by a compositional model, a tree-structured representation for the first user input based on a parsing by the compositional model, wherein the tree-structured representation comprises one or more non-terminal nodes associated with one or more intents, one or more non-terminal nodes associated with one or more slots, and one or more terminal nodes associated with one or more n-grams of the first user input;
resolve, by the one or more computing systems, the tree-structured representation by applying a depth-first search algorithm, wherein the tree-structured representation comprises one or more non-resolvable non-terminal nodes associated with the one or more slots, wherein each non-resolvable non-terminal node is associated with partial slot information corresponding to an n-gram that has not been resolved to a particular entity identifier, and wherein the partial slot information associated with each non-resolvable non-terminal node is passed to a respective non-terminal parent node, and wherein each non-terminal parent node of a non-resolvable non-terminal node is partially resolved based on the partial slot information, and wherein each non-resolvable non-terminal node is resolved based on the respective partially resolved non-terminal parent node of the non-resolvable non-terminal node;
generate, by the one or more computing systems, a response to the first user input based on the resolved tree-structured representation; and
send, by the one or more computing systems to the client system of the first user, instructions for presenting the response.

18. A system comprising: one or more processors; and a non-transitory memory coupled to the processors comprising instructions executable by the processors, the processors operable when executing the instructions to:
receive, by the one or more computing systems from a client system associated with a first user, a first user input comprising a plurality of n-grams;
generate, in response to receiving the first user input by a compositional model, a tree-structured representation for the first user input based on a parsing by the compositional model, wherein the tree-structured representation comprises one or more non-terminal nodes associated with one or more intents, one or more non-terminal nodes associated with one or more slots, and one or more terminal nodes associated with one or more n-grams of the first user input;
resolve, by the one or more computing systems, the tree-structured representation by applying a depth-first search algorithm, wherein the tree-structured representation comprises one or more non-resolvable non-terminal nodes associated with the one or more slots, wherein each non-resolvable non-terminal node is associated with partial slot information corresponding to an n-gram that has not been resolved to a particular entity identifier, and wherein the partial slot information associated with each non-resolvable non-terminal node is passed to a respective non-terminal parent node, and wherein each non-terminal parent node of a non-resolvable non-terminal node is partially resolved based on the partial slot information, and wherein each non-resolvable non-terminal node is resolved based on the respective partially resolved non-terminal parent node of the non-resolvable non-terminal node;
generate, by the one or more computing systems, a response to the first user input based on the resolved tree-structured representation; and
send, by the one or more computing systems to the client system of the first user, instructions for presenting the response.

* * * * *